(12) United States Patent
Takahashi et al.

(10) Patent No.: US 7,876,657 B2
(45) Date of Patent: Jan. 25, 2011

(54) INFORMATION RECORDING APPARATUS, AN INFORMATION RECORDING SYSTEM, A PROGRAM, AND A RECORDING MEDIUM

(75) Inventors: Masaetsu Takahashi, Kanagawa (JP); Ryoichi Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1003 days.

(21) Appl. No.: 11/587,342

(22) PCT Filed: Apr. 21, 2005

(86) PCT No.: PCT/JP2005/007627

§ 371 (c)(1),
(2), (4) Date: Feb. 27, 2007

(87) PCT Pub. No.: WO2005/104097

PCT Pub. Date: Nov. 3, 2005

(65) Prior Publication Data

US 2007/0223337 A1 Sep. 27, 2007

(30) Foreign Application Priority Data

Apr. 26, 2004 (JP) ............................. 2004-130285
May 24, 2004 (JP) ............................. 2004-153263

(51) Int. Cl.
*G11B 5/58* (2006.01)
(52) U.S. Cl. .............. 369/53.21; 369/53.17; 369/30.03
(58) Field of Classification Search .............. 369/53.17, 369/53.21, 47.12, 84, 30.03
See application file for complete search history.

(56) References Cited

U.S. PATENT DOCUMENTS

| | | | |
|---|---|---|---|
| 5,764,607 A | 6/1998 | Maeda et al. | |
| 6,594,207 B2 | 7/2003 | Suzuki | |
| 6,731,577 B2 | 5/2004 | Suzuki | |
| 6,782,434 B1 | 8/2004 | Suzuki | |
| 7,110,339 B2 | 9/2006 | Suzuki | |
| 2003/0059205 A1 | 3/2003 | Suzuki | |
| 2003/0231559 A1 | 12/2003 | Suzuki | |
| 2005/0063290 A1 | 3/2005 | Suzuki | |

FOREIGN PATENT DOCUMENTS

| | | |
|---|---|---|
| EP | 1045386 A1 | 10/2000 |
| EP | 1045388 A1 | 10/2000 |
| EP | 1 049 087 A2 | 11/2000 |
| JP | 10-302265 | 11/1998 |
| JP | 11-306546 | 11/1999 |

(Continued)

*Primary Examiner*—Ali Neyzari
(74) *Attorney, Agent, or Firm*—Dickstein Shapiro LLP

(57) ABSTRACT

An information recording apparatus, an information recording system, a program, and a recording medium are disclosed, by which contents are legally recorded to another information recording medium. Copy-once contents stored in a first optical disk are written to the second optical disk. After this writing is completed, a laser light having power equal to recording power is irradiated to the first optical disk so that reproduction of the copy-once contents in the first optical disk is made impossible. In this way, the copy-once contents stored in the first optical disk are erased, and the contents are moved to the second optical disk without jeopardizing the "copy-once" attribute of the contents. That is, the contents can be legally moved to another information recording medium.

20 Claims, 22 Drawing Sheets

FOREIGN PATENT DOCUMENTS

| | | |
|---|---|---|
| JP | 2000-163883 | 6/2000 |
| JP | 2000-347946 A | 12/2000 |
| JP | 2002-163577 | 7/2002 |
| JP | 2003-308650 A | 10/2003 |
| WO | WO 89/06428 | 7/1989 |

| | MANAGEMENT INFORMATION | CONTENTS A | |
|---|---|---|---|

FIG.7

| Bit<br>Byte | 7 | 6 | 5 | 4 | 3 | 2 | 1 | 0 |
|---|---|---|---|---|---|---|---|---|
| 0 | \multicolumn{8}{c}{Operational Code} |
| 1 | \multicolumn{8}{c}{Reserved} |
| 2 | (MSB) | | | | | | | |
| 3 | \multicolumn{8}{c}{Logical Block Address} |
| 4 | | | | | | | | |
| 5 | | | | | | | | (LSB) |
| 6 | \multicolumn{8}{c}{Reserved} |
| 7 | (MSB) | | | | | | | |
| 8 | \multicolumn{8}{c}{Length} |
| | | | | | | | | (LSB) |
| 9 | \multicolumn{8}{c}{Reserved} |
| 10 | \multicolumn{8}{c}{Reserved} |
| 11 | \multicolumn{8}{c}{Reserved} |

FIG.16

| MANAGEMENT NUMBER | TITLE | CHANNEL | STARTING DATA/TIME | ENDING DATE/TIME | QUALITY | LOCATION | KIND | STATE |
|---|---|---|---|---|---|---|---|---|
| 1 | NEWS | TERRESTRIAL A 2CH | 2003/01/24 10:00 | 2003/01/24 11:00 | LP | 004000h 01F000h | Copy Free | PRESENT |
| 2 | PRIME TIME | TERRESTRIAL A 5CH | 2003/01/25 19:00 | 2003/01/25 21:00 | SP | 020000h 0FF000h | Copy Once | PRESENT |
| 3 | SERIAL DRAMA | SATELLITE B 13CH | 2003/01/26 7:00 | 2003/01/26 7:40 | SP | 100000h 17F000h | Copy Once | PRESENT |

FIG.18

| MANAGEMENT NUMBER | TITLE | CHANNEL | STARTING DATE/TIME | ENDING DATE/TIME | QUALITY | LOCATION | KIND | STATE |
|---|---|---|---|---|---|---|---|---|
| 1 | NEWS | TERRESTRIAL A 2CH | 2003/01/24 10:00 | 2003/01/24 11:00 | LP | 004000h 01F000h | Copy Free | PRESENT |
| 2 | PRIME TIME | TERRESTRIAL A 5CH | 2003/01/25 19:00 | 2003/01/25 21:00 | SP | 020000h 0FF000h | Copy Once | PRESENT |
| 3 | SERIAL DRAMA | SATELLITE B 13CH | 2003/01/26 7:00 | 2003/01/26 7:40 | SP | 100000h 17F000h | Copy Once | PRESENT |
| 4 | MIDNIGHT MOVIE | SATELLITE B 11CH | 2003/02/01 23:50 | 2003/02/02 1:30 | HQ | 180000h 22F000h | Copy Free | PRESENT |

FIG.21

| MANAGEMENT NUMBER | TITLE | CHANNEL | STARTING DATA/TIME | ENDING DATE/TIME | QUALITY | LOCATION | KIND | STATE |
|---|---|---|---|---|---|---|---|---|
| 1 | NEWS | TERRESTRIAL A 2CH | 2003/01/24 10:00 | 2003/01/24 11:00 | LP | 004000h 01F000h | Copy Free | PRESENT |
| 2 | PRIME TIME | TERRESTRIAL A 5CH | 2003/01/25 19:00 | 2003/01/25 21:00 | SP | 020000h 0FF000h | Copy Once | PRESENT |
| 3 | SERIAL DRAMA | SATELLITE B 13CH | 2003/01/26 7:00 | 2003/01/26 7:40 | SP | 100000h 17F000h | Copy Once | DESTROYED |
| 4 | MIDNIGHT MOVIE | SATELLITE B 11CH | 2003/02/01 23:50 | 2003/02/02 1:30 | HQ | 180000h 22F000h | Copy Free | PRESENT |

FIG.24

| MANAGEMENT NUMBER | TITLE | CHANNEL | STARTING DATE/TIME | ENDING DATE/TIME | QUALITY | LOCATION | KIND | STATE |
|---|---|---|---|---|---|---|---|---|
| 1 | NEWS | TERRESTRIAL A 2CH | 2003/01/24 10:00 | 2003/01/24 11:00 | LP | 004000h 01F000h | Copy Free | PRESENT |
| 2 | PRIME TIME | TERRESTRIAL A 5CH | 2003/01/25 19:00 | 2003/01/25 21:00 | SP | 020000h 0FF000h | Copy Once | PRESENT |
| 3 | SERIAL DRAMA | SATELLITE B 13CH | 2003/01/26 7:00 | 2003/01/26 7:40 | SP | 100000h 17F000h | Copy Once | DELETED |
| 4 | MIDNIGHT MOVIE | SATELLITE B 11CH | 2003/02/01 23:50 | 2003/02/02 1:30 | HQ | 180000h 22F000h | Copy Free | PRESENT |

FIG.25

| MANAGEMENT NUMBER | TITLE | CHANNEL | STARTING DATE/TIME | ENDING DATE/TIME | QUALITY | LOCATION | KIND | STATE |
|---|---|---|---|---|---|---|---|---|
| 1 | NEWS | TERRESTRIAL A 2CH | 2003/01/24 10:00 | 2003/01/24 11:00 | LP | 004000h 01F000h | Copy Free | PRESENT |
| 2 | PRIME TIME | TERRESTRIAL A 5CH | 2003/01/25 19:00 | 2003/01/25 21:00 | SP | 020000h 0FF000h | Copy Once | PRESENT |
| 3 | SERIAL DRAMA | SATELLITE B 13CH | 2003/01/26 7:00 | 2003/01/26 7:40 | SP | 100000h 17F000h | Copy Once | PRESENT |
| 4 | MIDNIGHT MOVIE | SATELLITE B 11CH | 2003/02/01 23:50 | 2003/02/02 1:30 | HQ | 180000h 22F000h | Copy Free | PRESENT |

INFORMATION RECORDING APPARATUS, AN INFORMATION RECORDING SYSTEM, A PROGRAM, AND A RECORDING MEDIUM

TECHNICAL FIELD

The present invention generally relates to an information recording apparatus, an information recording system, a program, and a recording medium; and especially relates to an information recording apparatus, an information recording system, a program used by the information recording apparatus and the information recording system, and a recording medium that stores the program, wherein an optical disk is used as an object medium of information recording.

BACKGROUND ART

Recently and continuing, personal computers (PC) are widely used not only by corporations but also by individuals at ordinary homes with improved performance and economy. There, optical disks, such as a CD (compact disk) and a DVD (digital versatile disk), attract attention as recording media providing great storage capacity for low prices, and optical disk apparatuses that use such optical disks as the object media of information recording are widely spread as peripheral devices of the PCs.

In this way, information (contents) such as music pieces, movies, pictures, and computer software can be easily copied to another optical disk, which gives great damage to providers of the contents.

Then, a "copy-once" practice has been introduced so that copying the content is allowed only once by using an ID. The practice is used by some contents provided by satellite broadcasting, cable TV, and the like so that no multiple copying operations are allowed. The practice will be widely used in the future. Hereafter, a set of contents, copying of which set is allowed only once, is called "a copy-once content".

By the way, an optical disk can be degraded with a crack, dirt, and the like. In this case, if multiple copying of a set of contents in the degraded disk is allowed, copying may be performed. However, if the content is a "copy-once content", it cannot be copied, and the content has to be purchased again. Further, in the case of a write-once optical disk (for example, a DVD+R disk, and a DVD–R disk), stored information (content) can be erased (Patent Reference 1).

Below, background relative to the write-once disk is further described.

Information recording apparatuses are widely used for storing contents (such as provided by satellite broadcasting and cable TV) in a recording medium that has a great storage capacity. The recording medium includes the optical disk, such as a DVD (digital versatile disk).

However, since the information (content) stored in the optical disk is digitized, the content can be duplicated without degrading quality of the content such as image and sound. Such copying is often an illegal operation that causes great damage to content providers.

Then, in order to prevent the illegal copying operation, some contents bear an ID so that only one copying operation is permitted. Such contents are called "copy-once contents". Adding such IDs will be extensively used in the future.

By the way, the write-once optical disk that is widely used at present can be degraded by sunrays, a crack, dirt, etc. Generally, as a precaution, a backup copy is desired before the original disk becomes completely degraded, i.e., completely non-reproducible. However, an optical disk containing copy-once contents cannot be legally duplicated. In addition, various optical disks and apparatuses that are capable of preventing illegal copying operations and unauthorized use of contents have been devised (for example, Patent Reference 2 and Patent Reference 3).

However, such a devised optical disk disclosed by Patent Reference 2, and such devised data terminal apparatuses disclosed by Patent Reference 3 are expensive for general users.

[Patent reference 1] JPA H10-302265
[Patent reference 2] JPA 2000-163883
[Patent reference 3] JPA 2002-163577

DISCLOSURE OF PREFERRED EMBODIMENTS OF THE INVENTION

The first purpose of the present invention is to offer an information recording system that can record contents to a recording medium without legal jeopardy.

Further, the second purpose of the present invention is to offer a program that is executed by a computer included in the information recording system for legally recording the contents to the recording medium, and a recording medium for storing the program.

The third purpose is to offer an information recording apparatus that can legally move the contents stored in a write-once optical disk to an information recording medium other than the optical disk.

The fourth purpose of the present invention is to offer a program that is executed by a computer included in the information recording apparatus for legally moving the contents stored in the write-once optical disk to the recording medium other than the optical disk, and a recording medium that stores the program.

Means for Solving a Subject

The information recording system according to the present invention includes two optical disk apparatuses, namely, the first and the second optical disk apparatuses. The first optical disk apparatus is for reproducing contents stored in the first optical disk. The second optical disk apparatus is for recording the reproduced contents to the second optical disk. The information recording system further includes a control unit. The control unit causes a laser light to be irradiated to the first optical disk when the contents stored in the first optical disk have been recorded to the second optical disk, wherein power of the laser light is equivalent to recording power of the first optical disk so that no further reproduction of the contents of the first optical disk is possible.

According to an aspect of the present invention, the control unit controls such that the laser light is irradiated only to a zone wherein management information is recorded in the recording zone of the first optical disk.

According to another aspect of the present invention, the control unit controls such that the laser light is irradiated to all the recording zone of the first optical disk.

According to another aspect of the present invention, the control unit of the information recording system is capable of controlling such that the laser light is intermittently irradiated.

According to another aspect of the present invention, the control unit is capable of controlling such that the laser light is irradiated only to a zone that contains a set of content that has been duplicated to the second optical disk, when two or more contents are stored in the first optical disk.

According to another aspect of the present invention, the control unit is capable of controlling such that the laser light is irradiated only to a zone where there exists management information of a set of contents that has been duplicated to the second optical disk, when two or more sets of contents are stored in the first optical disk.

According to another aspect of the present invention, the control unit is capable of controlling such that the laser light is irradiated to the first optical disk only when the contents therein have been successfully duplicated to the second optical disk, wherein power of the laser light is equivalent to the recording power of the first optical disk.

According to another aspect of the present invention, the information recording system further includes a determining unit for determining whether a frequency of reproduction errors of the contents stored in the first optical disk is equal to or greater than a predetermined threshold value. If the frequency of the reproduction errors is greater than the threshold value as a result of determination by the determining unit, the control unit controls such that the contents are to be saved in the second optical disk.

According to another aspect of the present invention, the program used by the control unit that constitutes the information recording system with the two optical disk apparatuses includes a first step of writing the contents stored in the first optical disk set in the first optical disk apparatus to the second optical disk set in the second optical disk apparatus, and a second step of irradiating the laser light to the first optical disk when writing at the first step is completed. Here, power of the irradiation is equivalent to recording power of the first optical disk. The second step is to disable further reproduction of the contents from the first optical disk. The program is executed by the computer of the control unit.

According to another aspect of the present invention, the second step of the program is capable of irradiating the laser light only to the zone that contains management information of the recording zone of the first optical disk.

According to another aspect of the present invention, the second step of the program is capable of irradiating the laser light to all the recording zone of the first optical disk.

According to another aspect of the present invention, the second step of the program is capable of intermittently irradiating the laser light.

According to another aspect of the present invention, the second step of the program is capable of irradiating the laser light only to a zone of the first optical disk, the zone containing a set of content that has been duplicated to the second optical disk, where the first optical disk stores two or more contents.

According to another aspect of the present invention, the second step of the program is capable of irradiating the laser light only to a zone of the first optical disk, the zone containing the management information of a set of content that has been duplicated to the second optical disk, where the first optical disk stores two or more contents.

According to another aspect of the present invention, the program further includes a third step of determining whether writing at the first step has been successfully carried out; and the second step is carried out only when the determination at the third step is affirmative.

According to another aspect of the present invention, the program further includes a fourth step that is carried out in advance of the first step. The fourth step is for determining whether a frequency of errors when reproducing contents stored in the first optical disk is greater than the predetermined threshold value. If the determination is affirmative, the first step is carried out.

According to another aspect of the present invention, a recording medium that contains the program is offered. The recording medium is computer-readable and computer-executable.

According to another aspect of the present invention, the information recording apparatus includes an optical disk apparatus for information reproduction and information recording to a write-once optical disk, and a processing unit that disables reproduction of contents of the optical disk when the contents stored in the optical disk are recorded to a recording medium other than the optical disk by writing predetermined information to the optical disk through the optical disk apparatus.

According to another aspect of the present invention, the processing unit is capable of writing information indicating that the contents have been erased without actually erasing the contents so that further reproduction of the contents is made impossible.

According to another aspect of the present invention, the processing unit is capable of writing reviving information to the optical disk through the optical disk apparatus, the reviving information indicating that contents are revived if a request for recording the contents to the optical disk is made after the reproduction of the contents is made impossible.

According to another aspect of the present invention, the processing unit is capable of overwriting predetermined data to at least a part of the zone of the optical disk, in which zone contents are stored through the optical disk apparatus so that reproduction of the contents is made impossible.

According to another aspect of the present invention, the processing unit is capable of writing information indicating that the zone of the optical disk wherein contents are recorded is overwritten through the optical disk apparatus.

According to another aspect of the present invention, the information recording apparatus is capable of overwriting predetermined data through the optical disk apparatus after all contents are successfully written to a recording medium other than the optical disk.

According to another aspect of the present invention, the processing unit is capable of dividing the contents of the optical disk into two or more blocks of a predetermined size, writing the contents in blocks to an information recording medium other than the optical disk, and overwriting predetermined data through the optical disk apparatus to the blocks of the optical disk one by one when writing the contents in each of the blocks is successful.

According to another aspect of the present invention, after the contents have been moved, the processing unit is capable of reproducing the zone wherein the contents in the optical disk are recorded through the optical disk apparatus, and if there is no reproduction error, overwriting the predetermined data through the optical disk apparatus again to the zone.

According to another aspect of the present invention, the program for the computer of the information recording apparatus includes a step of writing the contents stored in the write-once optical disk to a recording medium other than the optical disk, and a step of writing the predetermined information to the optical disk so that further reproduction of the contents of the optical disk is made impossible.

According to another aspect of the present invention, the recording medium that contains the program is computer-readable.

Effectiveness of Invention

According to at least one of the embodiments of the present invention, if the contents stored in the first optical disk in the first optical disk apparatus are written to the second optical disk set in the second optical disk apparatus, the laser light is irradiated to the first optical disk from the first optical disk apparatus by the control unit, wherein the irradiation power of the laser light is equivalent to the recording power, so that further reproduction of the contents in the first optical disk is made impossible. That is, the contents stored in the first optical disk are erased, while the contents have been moved to the second optical disk from the first optical disk. In other words, "copy-once contents" can be moved to another recording medium without jeopardizing the attribute of the optical disk. In this way, the contents can be moved to another recording medium without legal jeopardy.

BRIEF DESCRIPTION OF THE DRAWINGS

FIG. 7 is a bit map for explaining a command of an erasing request.

FIG. 16 is a table showing the latest contents of the contents management table shown in FIG. 15.

FIG. 18 is a table for explaining the contents of the latest contents management table shown in FIG. 17.

FIG. 21 is a table of the latest contents of the contents management table after the moving process shown by FIG. 19.

FIG. 24 is a table showing the contents of the contents management table when making reproduction impossible without destroying the contents.

FIG. 25 is a table showing the contents of the contents management table when reviving the contents from the state of FIG. 24.

DESCRIPTION OF A CODE

10 Information recording system
15 First optical disk
15A DVD (optical disk)
20 First optical disk apparatus
90 Personal computer
92 MPU (control unit, determining unit)
100 DVD recorder (information recording apparatus)
101 MPU (micro processing unit, computer)
104 Flash ROM (recording medium)
110b Hard disk (recording medium)
112 DVD drive apparatus (optical disk apparatus).
115 Second optical disk
120 Second optical disk apparatus.

BEST MODE FOR CARRYING OUT THE INVENTION

Figure 1:
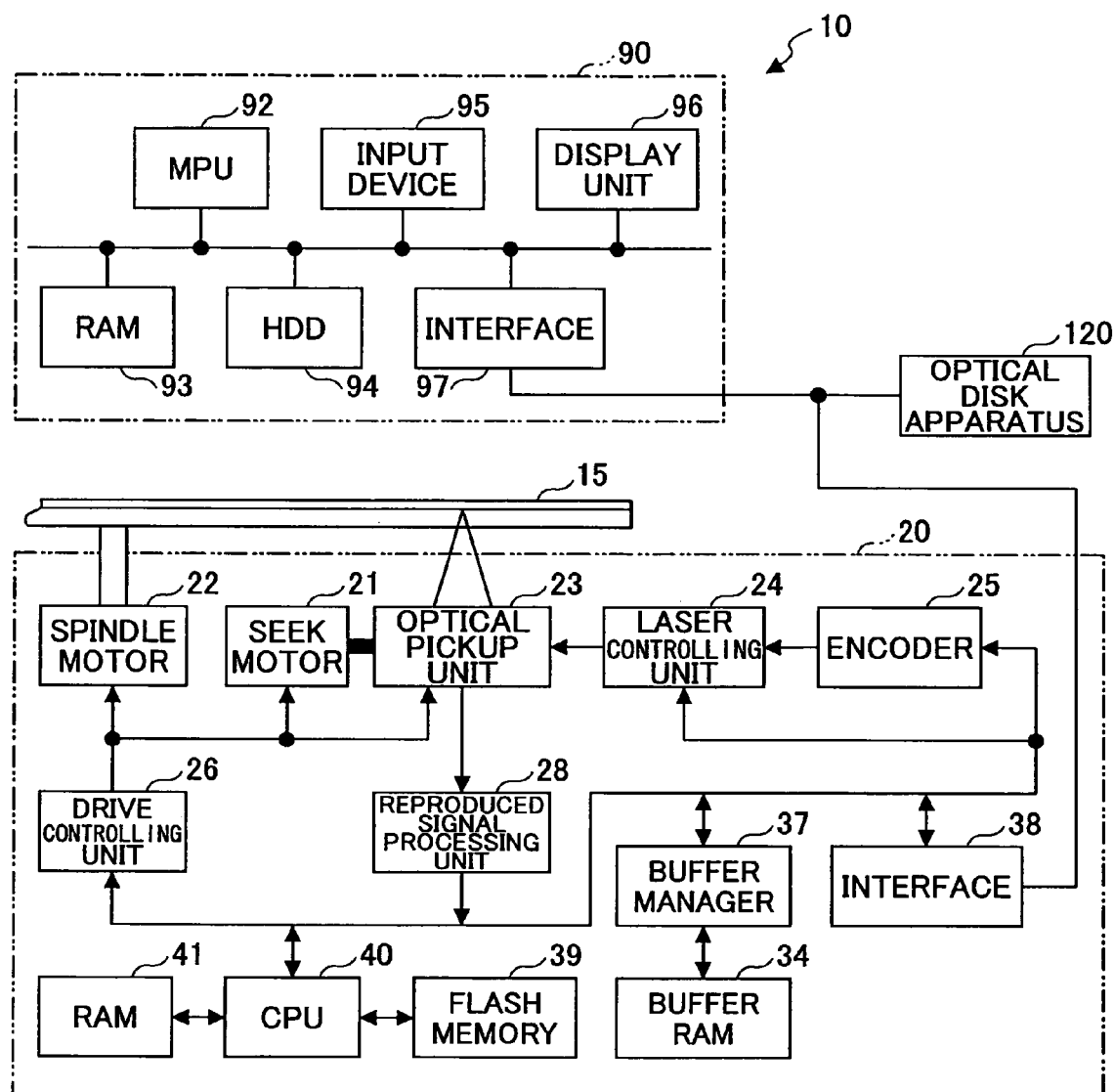
FIG. 1 is a block diagram showing the outline configuration of an information recording system according to an embodiment of the present invention.

Hereafter, an embodiment of the present invention is described with reference to FIGS. 1 through 9C. FIG. 1 shows the outline configuration of an information recording system 10 according to the embodiment of the present invention.

The information recording system 10 shown in FIG. 1 includes two optical disk apparatuses 20 and 120 for carrying out informational recording and informational reproduction to/from an optical disk, and a personal computer 90 that serves as the higher rank apparatus of the optical disk apparatuses 20 and 120. Connection lines shown in FIG. 1 are typical ones showing the flow of a typical signal and information, and not all connection lines are shown.

<<Personal Computer>>

The outline configuration of the personal computer 90 is described. The personal computer 90 includes a microcomputer (MPU) 92, a RAM 93, a hard disk (HDD) 94, an input device 95, a display unit 96, and an interface 97.

The MPU 92 performs a process and an operation according to a program loaded into the RAM 93.

The HDD 94 stores software including an operating system (OS) that is readable and executable by the MPU 92, and the program for carrying out the present invention. When the personal computer 90 is turned on, a part of the OS is loaded into the RAM 93, and stays resident. Further, the program stored in the HDD 94 is loaded into the RAM 93 as required, and is performed by the MPU 92.

The display unit 96 includes a display (not illustrated) of such as a CRT, a liquid crystal display (LCD), and a plasma display panel (PDP). The display unit 96 displays various information items according to directions from the MPU 92.

The input device 95 is an input medium (not illustrated) such as a keyboard, a mouse, a tablet, a light pen, and a touch panel. The input device 95 is for a user to input various information items to the MPU 92. Here, the information from the input medium may be transmitted through a wireless link. Further, the display unit 96 and the input device 95 may be combined; an LCD with a touch panel is an example.

The interface 97 provides a bi-directional communication interface between the optical disk apparatuses 20 and 120 based on a standard interface such as ATAPI (AT Attachment Packet Interface), SCSI (Small Computer System Interface), and USB (Universal Serial Bus).

<<Optical Disk Apparatus>>

Next, the configuration of the optical disk apparatuses 20 and 120 is described. The optical disk apparatuses 20 and 120 have almost the same configuration; accordingly, only the configuration of the optical disk apparatus 20 is described for convenience.

The optical disk apparatus 20 includes a spindle motor 22 for rotationally driving the optical disk 15, an optical pickup unit 23, a seek motor 21 for driving the optical pickup unit 23 in sledge directions, a laser controlling unit 24, an encoder 25, a drive controlling unit 26, a reproduced signal processing unit 28, a buffer RAM 34, a buffer manager 37, an interface 38, a flash memory 39, a MPU 40, and a RAM 41. In addition, according to the embodiment, a recording medium based on the specification of DVD+R is used as an example of the optical disk 15.

Figure 2:
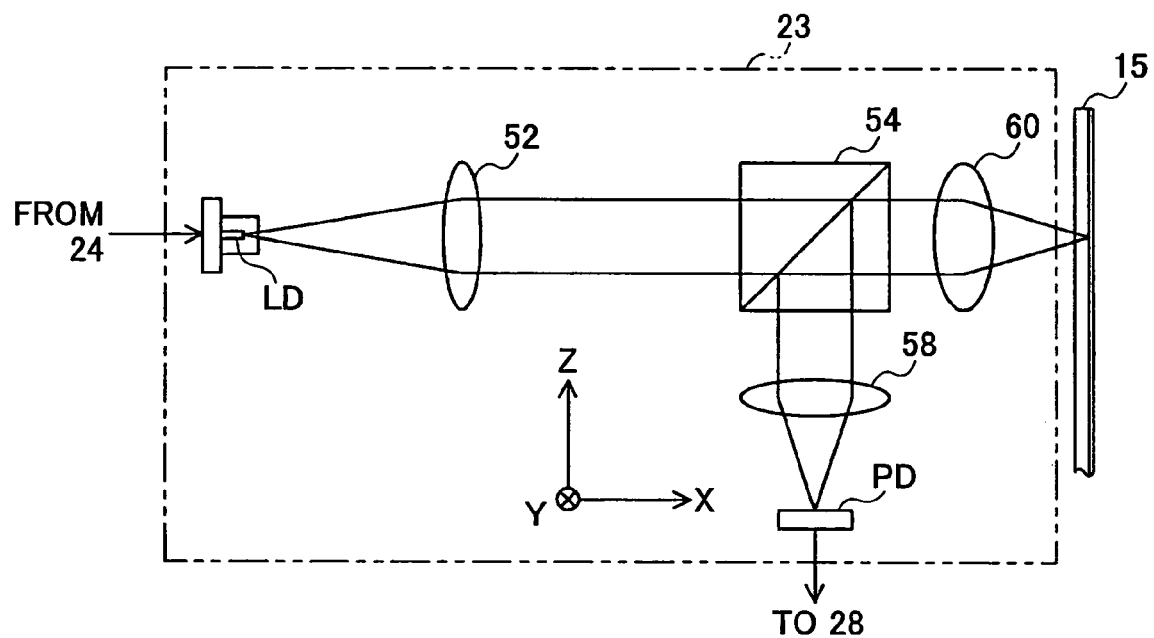
FIG. 2 is a schematic drawing of the configuration of an optical pickup unit of the information recording system shown by FIG. 1.

The optical pickup unit 23 is for irradiating a laser light to the recording surface of the optical disk 15, and for receiving the laser light reflected by the recording surface of the optical disk 15. The optical pickup unit 23 includes, for example, a semiconductor laser LD serving as a luminous source for irradiating the laser light whose wave length is about 660 nm, a collimation lens 52, a beam splitter 54, an objective lens 60, a detection lens 58, a photo detector PD, and a drive system (not illustrated) as shown in FIG. 2. Here, according to the embodiment, the direction of maximum intensity of the laser light irradiated by the semiconductor laser LD is the +X direction.

The collimation lens 52 for making the laser light from the semiconductor laser LD be approximately parallel light is provided on a +X side of the semiconductor laser LD. The beam splitter 54 is arranged on the +X side of the collimation lens 52, and is for deflecting a reflected beam from the optical disk 15 in a direction of −Z. The objective lens 60 is arranged on the +X side of the beam splitter 54, and condenses the beam transmitted through the beam splitter 54 to the recording surface of the optical disk 15. The detection lens 58 is arranged on the −Z side of the beam splitter 54, and condenses a return beam of the branched beam in the direction of −Z from the beam splitter 54 to a receiving surface of the photo detector PD. The photo detector PD outputs two or more signals including signals of wobble signal information, reproduction data, and servo information to the reproduced signal processing unit 28 like a usual optical pickup unit. The drive system (not illustrated) "micro drives" the objective lens 60 according to a drive signal from the drive controlling unit 26 in focal directions, i.e., directions of an optical axis of the objective lens 60 and tracking directions.

With reference to FIG. 1, the reproduced signal processing unit 28 acquires address information while generating servo signals (a focal error signal, track error signal, etc.), a clock signal, a RF signal, etc., based on the signals output by the photo detector PD that constitutes the optical pickup unit 23 output. Here, the servo signal is provided to the drive controlling unit 26, and the clock signal is provided to the encoder 25. Further, the address information is provided to the MPU 40. Furthermore, the reproduced signal processing unit 28 performs a decoding process, an error detection process, etc., on the RF signal. If an error is detected, a correction process is performed; the corrected reproduction data are stored in the buffer RAM 34 through the buffer manager 37. In addition, the error information (for example, an error rate) detected at the error detection process is sent to the MPU 40. In this way, a generating frequency of the reproduction error is known by the MPU 40.

The drive controlling unit 26 generates the drive signal for compensating for a location error of the objective lens 60 based on the servo signal from the reproduced signal processing unit 28, and outputs the drive signal to the drive system of the optical pickup unit 23. Further, the drive controlling unit 26 generates a drive signal for driving the seek motor 21 and a drive signal for driving the spindle motor 22 based on directions of the MPU 40. The driving signals are respectively provided to the seek motor 21 and the spindle motor 22.

The buffer RAM 34 is for storing data stored in the optical disk 15 to be recorded, and temporarily storing reproduction data reproduced from the optical disk 15. Input and output data to/from the buffer RAM 34 are managed by the buffer manager 37.

The encoder 25 takes out the data to be recorded stored in the buffer RAM 34 through the buffer manager 37 based on directions of the MPU 40, modulates the data, adds an error correction code, and generates a signal to be written (writing signal) into the optical disk 15. The writing signal generated here is provided to the laser controlling unit 24.

The laser controlling unit 24 controls the power of the laser light irradiated from the semiconductor laser LD. When recording, the drive signal of the semiconductor laser LD is generated based on, for example, the writing signal, recording conditions, and luminescent characteristics of the semiconductor laser LD.

The interface 38 is a communication interface based on the same specification as the interface 97 of the personal computer 90, and is connected to the interface 97.

The flash memory 39 includes a program zone and a data zone. The program described is encoded, stored in the program zone of the flash memory 39, and decoded by the MPU 40. Further, the recording conditions, the luminescent characteristics of the semiconductor laser LD, etc., are stored in the data zone.

The above MPU 40 saves data required for control and the like in the RAM 41, while controlling operations of each unit described above according to the program stored in the program zone of the flash memory 39.

Next, the recording process of recording the contents currently stored in the optical disk to another optical disk (recording medium) is described using the information recording system 10 that is configured as described above.

Figure 3:
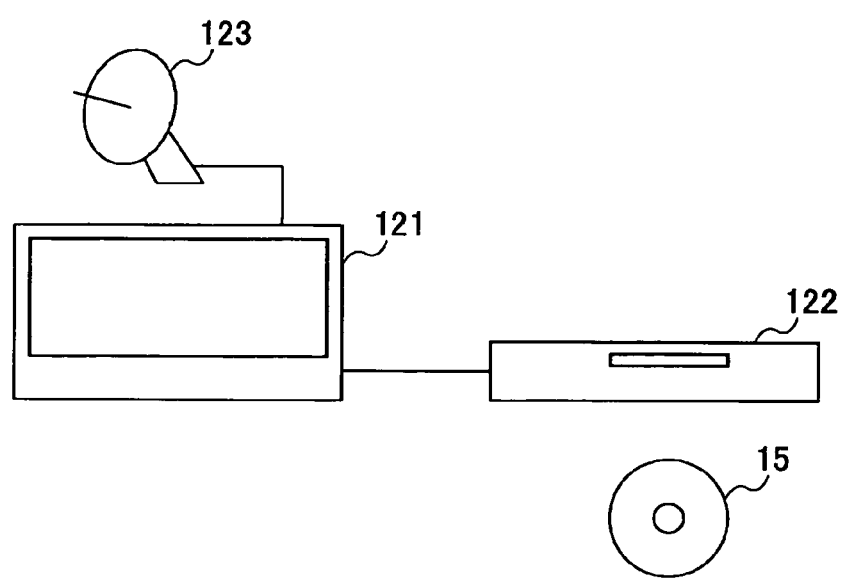
FIG. 3 is a schematic drawing for explaining contents.
Figures 4, 5:
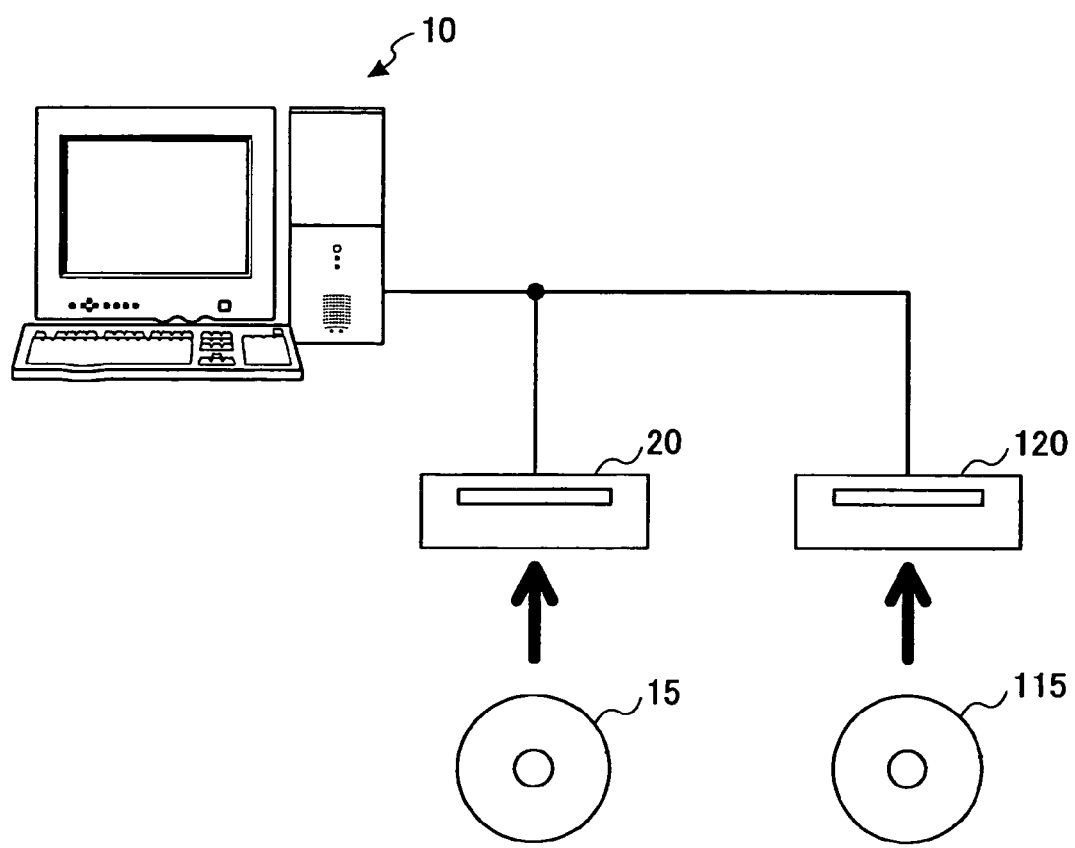
FIG. 4 is a map of an optical disk that stores the contents.
FIG. 5 is a schematic drawing for explaining a recording process of recording the contents using the information recording system shown by FIG. 1.

For the purpose of describing the present embodiment, the contents to be recorded are called Contents A, which are "copy-once contents", for example, received by a television receiver 121 through an antennal 123, and stored in the optical disk 15 by a recorder 122 as shown in FIG. 3. In this optical disk 15, not only Contents A but also management information are stored as shown in FIG. 4. Further, as shown in FIG. 5, the optical disk 15 is loaded in the optical disk apparatus 20, and another optical disk 115 is loaded in the optical disk apparatus 120.

Figure 6:
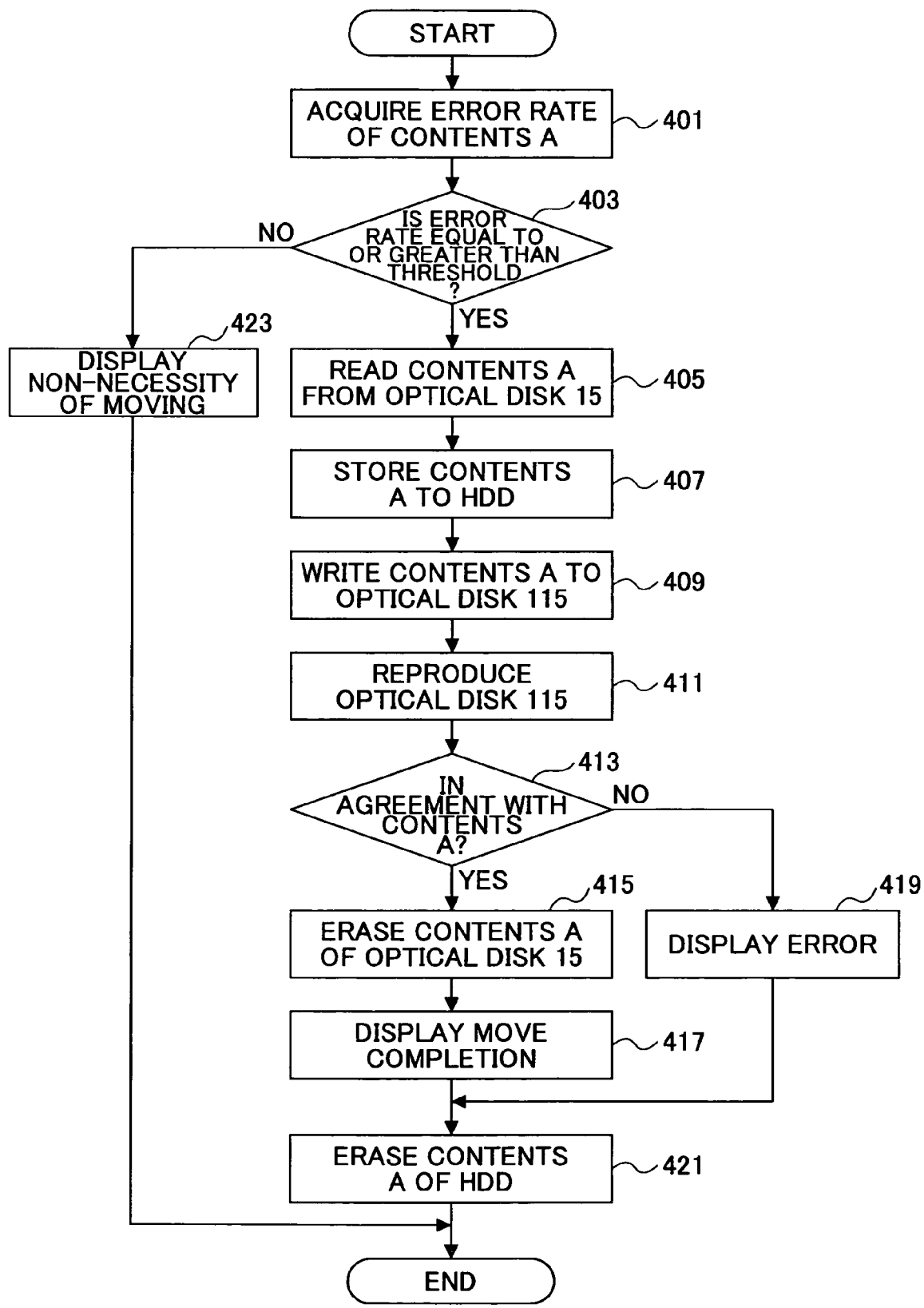
FIG. 6 is a flowchart for explaining the recording process and an operation of recording the contents performed by a MPU (computer) of the information recording system shown by FIG. 1.

If the user inputs a recording request of Contents A through an input device 95 (described below), a program as shown in FIG. 6 is executed, which program is called a "recording process program". Specifically, a starting address of the program is loaded in a program counter of the MPU 92, and the recording process program is started. The flowchart of FIG. 6 is a series of steps of a processing algorithm performed by the MPU 92.

When the program is started, at step 401, an error rate (frequency of reproduction errors generated) of Contents A is acquired through the optical disk apparatus 20.

At step 403, it is determined whether the error rate of Contents A is equal to or greater than a predetermined threshold value. If the error rate is equal to or greater than the threshold value, the process proceeds to step 405.

At step 405 Contents A are read from the optical disk 15 through the optical disk apparatus 20.

The read Contents A are stored in the HDD 94 at step 407.

At step 409 the read contents A are written into the optical disk 115 through the optical disk apparatus 120.

At step 411 a zone of the optical disk 115 where Contents A are written is reproduced by the optical disk apparatus 120.

At step 413 it is determined whether the data reproduced at step 411 are in agreement with Contents A stored in the HDD 94. That is, it is determined whether the writing of Contents A to the optical disk 115 is correctly performed. If the reproduced data are in agreement with Contents A, i.e., the determination is affirmative, the process proceeds to step 415.

At step 415, Contents A stored in the optical disk 15 are erased by the optical disk apparatus 20. Specifically, an erasing command is issued to the optical disk apparatus 20; the erasing command includes a start address of a logical block address to be erased, and a size (length) of the zone to be erased as shown in FIG. 7. Operations and processes of the optical disk apparatus 20 when receiving the erasing command are described below. Here, since the erasing command is not standardized, a predetermined operational code, which is not used otherwise, is used between the personal computer 90 and the optical disk apparatus 20.

At step 417 a screen advising that recording Contents A to the optical disk 115 is completed is displayed on the display unit 96.

At step 421 Contents A stored in the HDD 94 are erased, and the recording process is ended.

In addition, at step 413, if the reproduced data are not in agreement with Contents A, the process proceeds to step 419. At step 419 error information is displayed on the display unit 96, and the process proceeds to step 421.

Further, at step 403, if the error rate is less than the threshold value, the process proceeds to step 423. At step 423, a screen indicating that movement of Contents A is unnecessary is displayed on the display unit 96, and the recording process is ended.

Next, operations of the optical disk apparatus 20 when receiving the erasing command are described with reference to a flowchart in FIG. 8. The flowchart shows a series of steps of an algorithm performed by the MPU 40.

Figure 8:
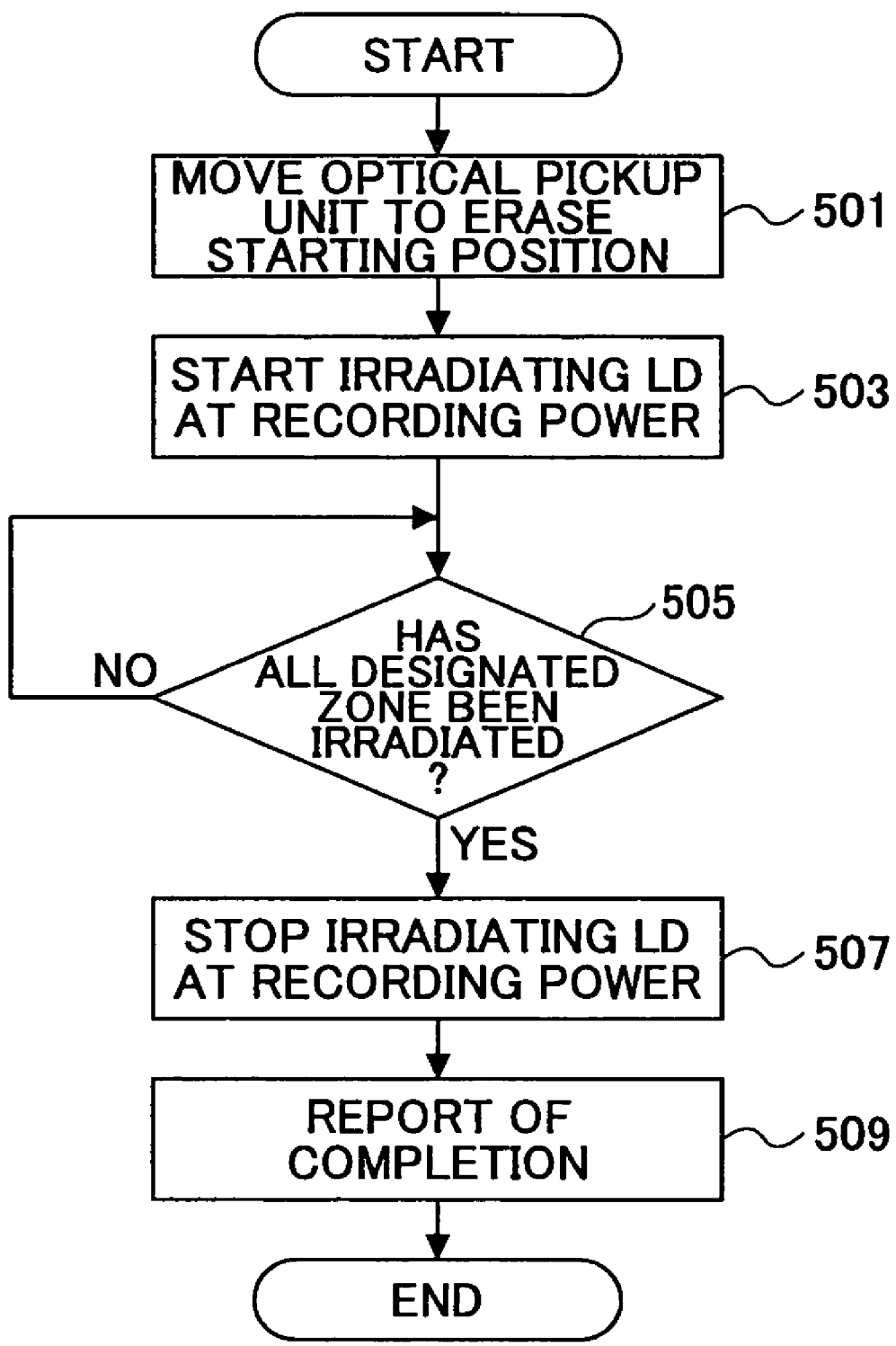
FIG. 8 is a flowchart for explaining a process and an operation of the MPU shown in FIG. 1 when receiving the command of the erasing request.

When the erasing command is received from the personal computer 90, an erasing process is performed according to the flowchart shown in FIG. 8; specifically, a starting address is loaded in a program counter of the MPU 40, and the erasing process is started.

First, at step 501, the seek motor 21 is driven in order to move the optical pickup unit 23 so that an optical spot may be formed at a location corresponding to the start address (erase starting position) of a zone to be erased (Logical Block Address), which start address is described by the erasing command.

At step 503 power of a laser light irradiated by a semiconductor laser LD is made almost equal to recording power through the laser controlling unit 24. Then, overwriting is started from the erase starting position.

At step 505 it is determined whether the size of the overwritten zone has reached the size (Length) of the zone to be erased. If the determination is negative, overwriting is continued until the size of the overwritten zone reaches the size of the zone to be erased. If the determination is affirmative, the process proceeds to step 507.

At step 507 the power of the laser light irradiated from the semiconductor laser LD is reduced to base power so that overwriting is stopped.

At step 509, information that the erasing process has been completed is provided to the personal computer 90, and the erasing process is ended.

As described above, control and determination of the information recording system 10 of the embodiment of the present invention are realized by the MPU 92 of the personal computer 90, and the program performed by the MPU 92.

Namely, control is realized by steps 405 through 415 shown in FIG. 6, and determination is realized by steps 401 and 403. Nevertheless, the present invention is not limited to this. That is, a variation may be that at least a part of the control and the determination is realized by hardware; or further, all the processing steps may be realized by hardware.

Further, according to the present embodiment, the program according to an embodiment of the present invention is performed in the recording process program among the programs stored in the HDD 94. That is, the first process is performed by the program corresponding to steps 405 through 409 of FIG. 6, the second process is performed by the program corresponding to step 415, the third process is performed by the program corresponding to steps 411 and 413, and the fourth process is performed by the program corresponding to steps 401 and 403.

As described above, according to the information recording system 10 of the present embodiment, Contents A stored in the optical disk 15 (the first optical disk 15) are written in another information recording medium such as the optical disk 115 (the second optical disk 115). After writing is completed, the laser light of power equal to the recording power is irradiated to the optical disk 15, and reproduction of Contents A from the optical disk 15 is made impossible. That is, Contents A stored in the optical disk 15 are erased, and they are now stored in the optical disk 115, which means that Contents A are moved to the optical disk 115 from the optical disk 15 without jeopardizing the "copy-once" attribute of Contents A. In this way, recording contents onto another information recording media is legally performed.

Further, according to this embodiment, recording Contents A currently stored in the optical disk 15 to the optical disk 115 is performed only when the error rate is equal to or greater than the threshold value; in this way, unnecessary recording can be prevented.

Figure 9A:
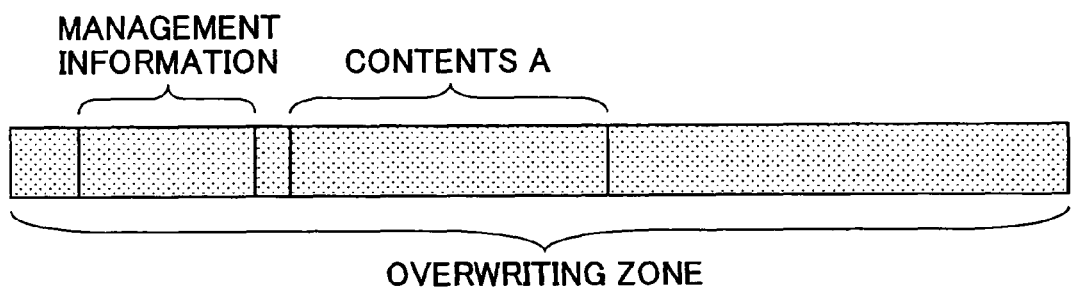
FIG. 9A is a zone map of an optical disk 15 when the recording process of contents is completed.
Figure 9B:
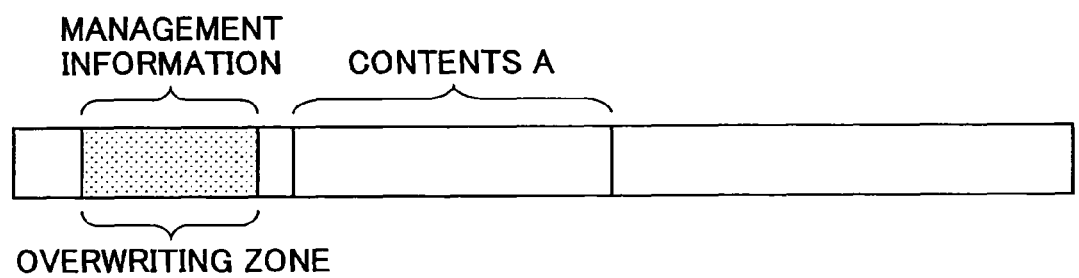
FIG. 9B is a zone map of the optical disk 15 when the record process of the contents is completed.
Figure 9C:
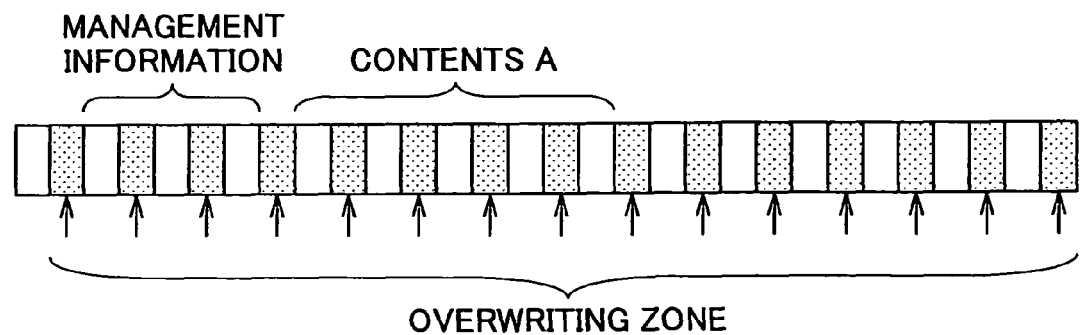
FIG. 9C is a zone map of the optical disk 15 when the record process of the contents is completed.

Further, according to the embodiment, the zone to be erased of the optical disk 15 is defined by the starting address (Logical Block Address) and the size (Length) of the zone to be erased, which information is described by the erasing command. Then, various erasing modes can be considered. For example, as shown in FIG. 9A, all the recording zone may be overwritten; as shown in FIG. 9B, only management information may be overwritten, which shortens the erasing time; and as shown in FIG. 9C, the erasing command is intermittently issued two or more times. In this manner, contents can be erased and the erasing time can be shortened. The user can select a desired erasing mode depending on the contents to be erased and a processing time allowable.

Figure 10:
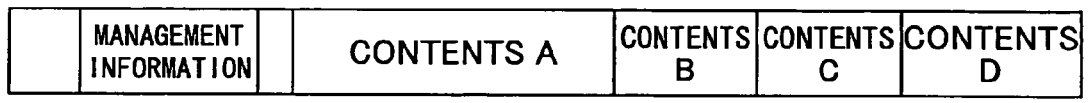
FIG. 10 is a zone map of the optical disk that stores two or more contents.
Figure 11A:
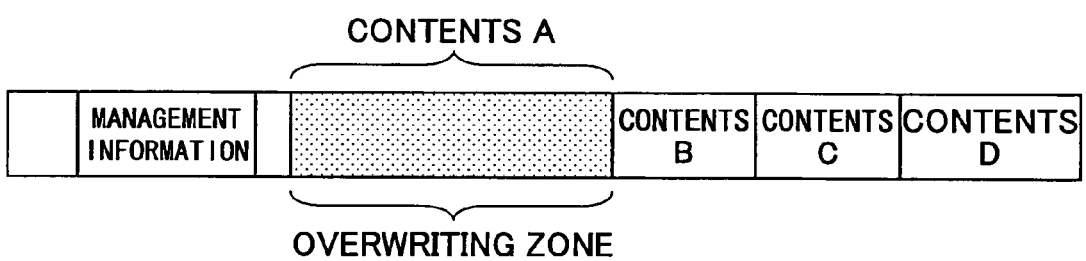
FIG. 11A is a zone map of the optical disk shown in FIG. 10 when Contents A are moved to another information recording media.
Figure 11B:
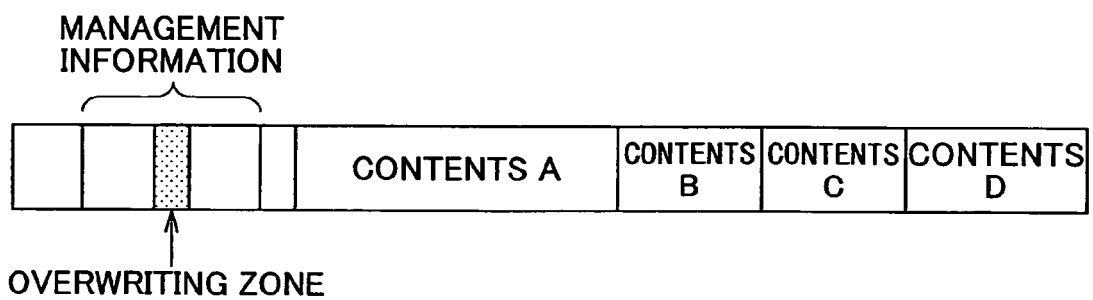
FIG. 11B is a zone map of the optical disk shown in FIG. 10 when Contents A are moved to another information recording media.

Above, the embodiment is described where in only Contents A are stored in the optical disk 15. Often, two or more sets of contents are stored in the optical disk 15 as shown in FIG. 10. In this case, Contents A, for example, can be moved without affecting other contents, if only the zone where Contents A are recorded is overwritten out of the whole recording zone of the optical disk 15 as shown in FIG. 11A. In this case, only the zone where the management information about Contents A is recorded may be erased as shown in FIG. 11B out of all the zones where management information is recorded. In this way, the erasing time can be shortened.

Further, it has been described that contents with the error rate that is equal to or greater than the threshold value are moved to another optical disk; however, all the contents may be moved to another optical disk regardless of the error rate. In this case, steps 401, 403, and 423 in FIG. 6 are dispensed with.

Further, in the embodiment, at least one of the optical disk apparatuses 15 and 115 may be built into the personal computer 90.

Further, the embodiment described above refers to the case wherein the optical disk is a DVD+R disk; however, the present invention is not be limited to this, but rather other recording media may be used, such as a CD–R disk, a DVD–R disk, and a next generation disk using a wave length of about 405 nm. For example, when a CD–R disk is used, a TOC (Table of Contents) zone is where the management information is recorded.

Further, although the embodiment described above refers to the case where the contents stored in a write-once type optical disk are moved to another optical disk, the present invention is not limited to this, but rather the present invention can be applied to the case where the contents are moved to a recording medium other than an optical disk.

Figure 12:
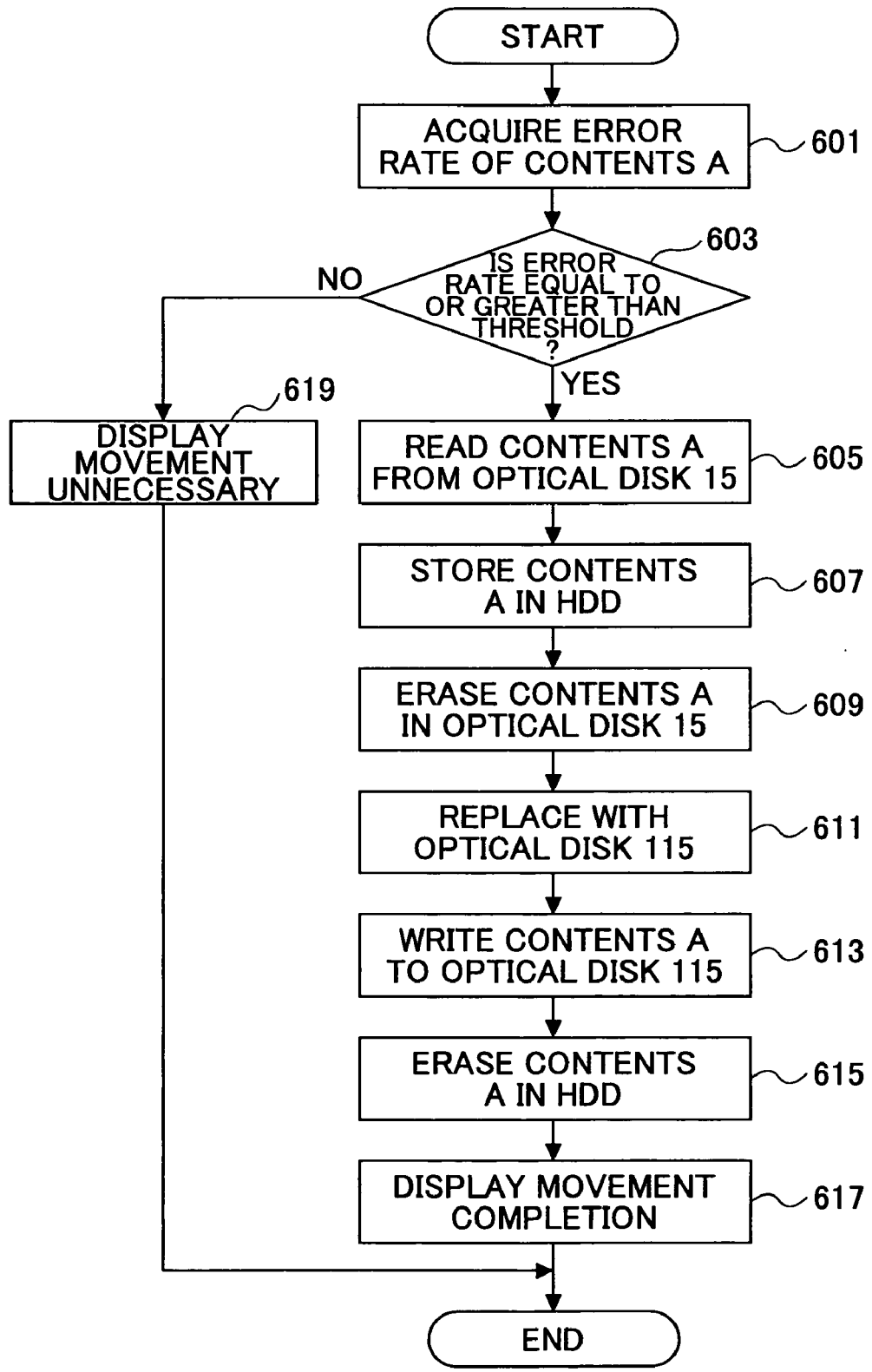
FIG. 12 is a flowchart of a process and operation carried out by the MPU in the recording process of recording the contents using one optical disk apparatus.

Further, although the embodiment described above refers to the case where the information recording system includes two optical disk apparatuses, the invention is applicable to the case wherein only one optical disk apparatus is used. The recording process of the information recording system having only one optical disk apparatus 20 is described using FIG. 12. Here, the optical disk 15 is loaded in the optical disk apparatus 20.

First, at step 601 the error rate (frequency of reproduction errors generated) of Contents A is acquired through the optical disk apparatus 20.

At step 603 it is determined whether the error rate of Contents A is equal to or greater than the predetermined threshold value. If affirmative, the process proceeds to step 605.

At step 605 Contents A are read from the optical disk 15 through the optical disk apparatus 20.

Contents A that are read are stored in the HDD 94 at step 607.

At step 609 Contents A stored in the optical disk 15 are erased, like step 415.

At step 611 the display unit 96 shows a request to change the optical disk 15 to another optical disk (here, optical disk 115).

At step 613 it is determined that the optical disk has been replaced, and Contents A stored in the HDD 94 are written into the optical disk 115 through the optical disk apparatus 20.

At step 615 Contents A stored in the HDD 94 are erased.

At step 617 the display unit 96 shows that recording of Contents A to the optical disk 115 has been completed, and the recording process is ended.

In addition, if the determination at step 603 is negative, the process proceeds to step 619, where a screen indicating that moving of Contents A is unnecessary is shown by the display unit 96. Then, the recording process is ended.

Here, before erasing Contents A stored in the HDD 94 (step 615), the same steps as steps 411 and 413 may be performed in order to determine that writing Contents A to the optical disk 115 has been successfully performed. In this case, if writing has not been successfully performed, a new optical disk 115 may be loaded in the optical disk apparatus 20 to serve as the optical disk 115 without erasing Contents A stored in the HDD 94 for writing Contents A to the replacement optical disk 115.

Furthermore, in this case, too, any or all the contents in the optical disk 115 may be moved regardless of the error rate. That is, steps 601, 603, and 619 in FIG. 12 may be omitted.

Further, although the embodiment has been described as storing the program in the HDD 94, the program may be stored in other recording media such as a CD, a magneto-optical disk, a DVD disk, a memory card, a USB memory, and a flexible disk. In this case, the program is loaded into the RAM 93 through a reproducing apparatus or a special interface corresponding to a selected recording medium. Further, the program may be loaded into RAM 93 through a network such as a LAN, Intranet, and Internet. In short, the program may be stored in the RAM 93 through any means.

Below, the present invention is described about the case of a write-once optical disk.

Figure 13:
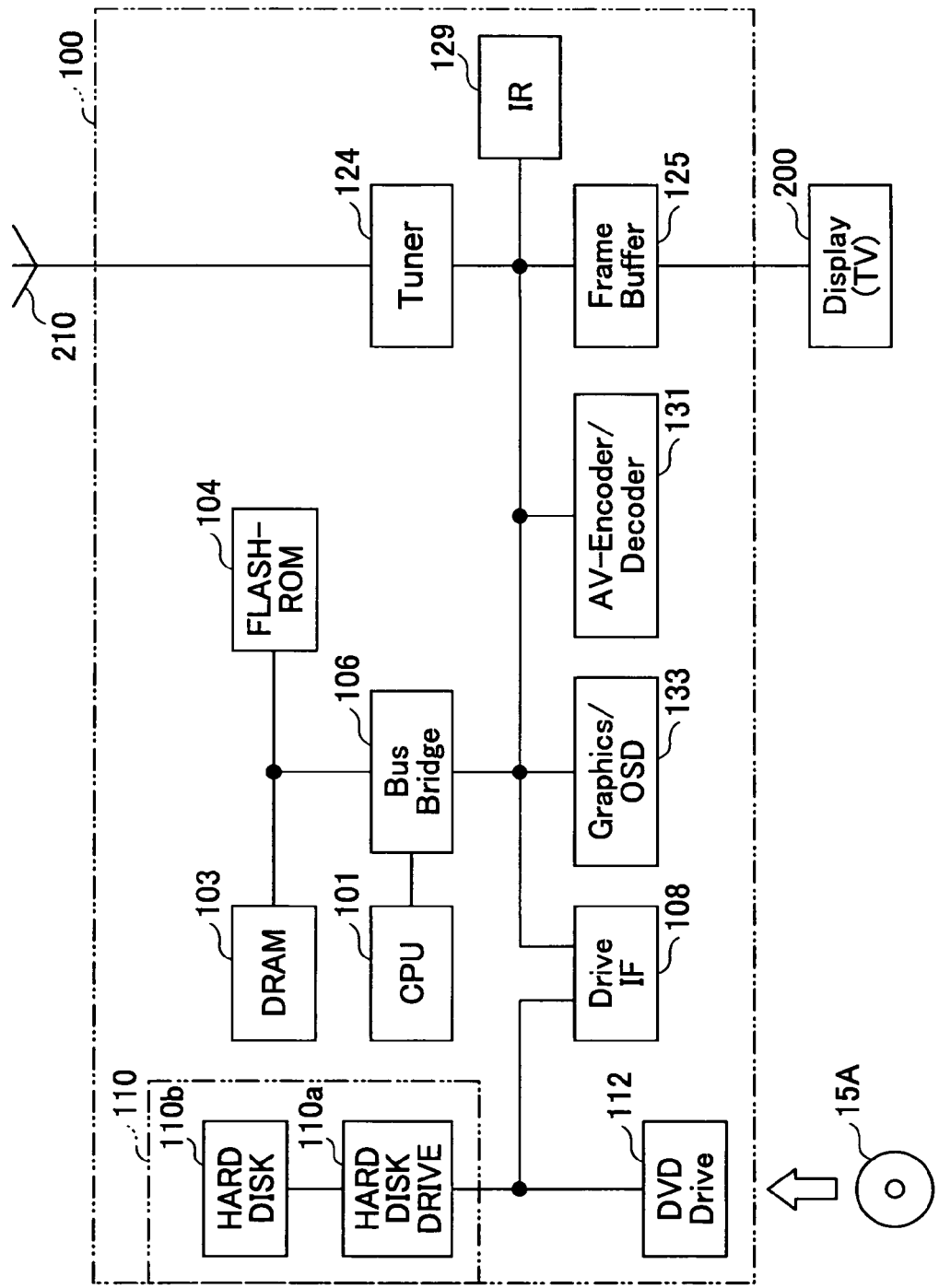
FIG. 13 is a block diagram showing an outline configuration of a DVD recorder according to an embodiment of the present invention.

Hereafter, another embodiment of the present invention is described with reference to FIGS. 13 through 22. FIG. 13 shows the outline configuration of a DVD recorder 100 serving as the information recording apparatus according to the embodiment of the present invention.

The DVD recorder 100 includes a MPU (CPU) 101, a dynamic RAM (DRAM) 103, a flash ROM 104, a bus bridge 106, a drive interface (Drive IF) 108, a hard disk drive unit 110, a DVD drive apparatus (DVD Drive) 112 serving as the optical disk apparatus, a tuner 124, a frame buffer 125, an IR controller (IR) 129, an AV encoder/decoder 131, and a graphic controller (Graphics/OSD) 133.

Programs including the program according to an embodiment of the present invention described in code are stored in the flash ROM 104, which programs are readable and executable by the MPU 101.

The MPU 101 controls each component described above according to the programs stored in the flash ROM 104. The DRAM 103 provides a working storage space. The MPU 101 accesses the DRAM 103 and the flash ROM 104 through the bus bridge 106.

The tuner 124 is for receiving a broadcast program through an antenna 210.

The frame buffer 125 is for storing data that are displayed on a display 200 (Display (TV)) 200.

The bus bridge 106 includes a DMA controller, and is for exchange data between the components.

The drive interface 108 is based on standard interfaces, such as ATAPI (AT Attachment Packet Interface), SCSI (Small Computer System Interface), and USB (Universal Serial Bus).

The IR controller 129 is for receiving user directions from an infrared remote control unit (not illustrated).

The AV encoder/decoder 131 is for compressing/decompressing digital sound and digital images.

The graphic controller 133 is for generating graphics such as guide information.

The bus bridge 106, the drive interface 108, the tuner 124, the frame buffer 125, the IR controller 129, the AV encoder/decoder 131, and the graphic controller 133 are connected to each other through a bus.

The hard disk drive unit 110 and the DVD drive apparatus 112 are connected to the drive interface 108.

The hard disk drive unit 110 includes a hard disk drive (Hard Disk Drive) 110a and a hard disk 110b, and the hard disk drive 110a performs recording and reproduction of data to/from hard disk 10b according to directions of the MPU 101.

The DVD drive apparatus 112 performs recording and reproduction of data to/from the DVD disk 15A according to directions of the MPU 101.

Figure 14:
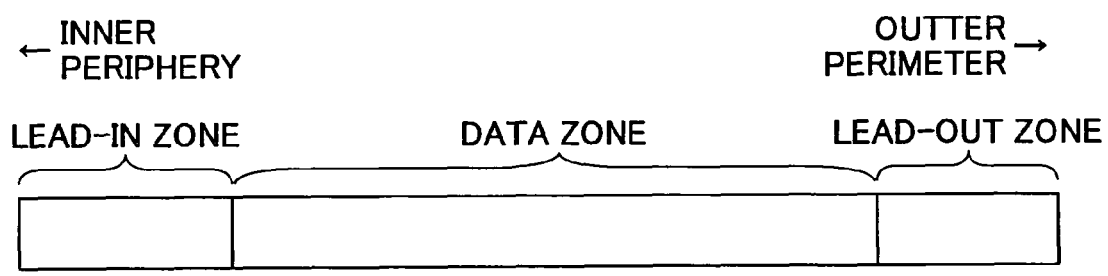
FIG. 14 is a zone map showing a layout of the recording zone of a DVD disk.

A spiral-like track is formed on a recording surface of the DVD disk 15A (referred to as DVD 15A) set in the DVD drive apparatus 112. A recording zone of DVD 15A is divided into a lead-in zone, a data zone, and a lead-out zone. They are usually positioned from the inner periphery side toward the outer perimeter side in this sequence as shown in FIG. 14. Here, the embodiment is described about the case wherein a DVD+R, which is a write-once optical disk, is used as the DVD 15A.

Figure 15:
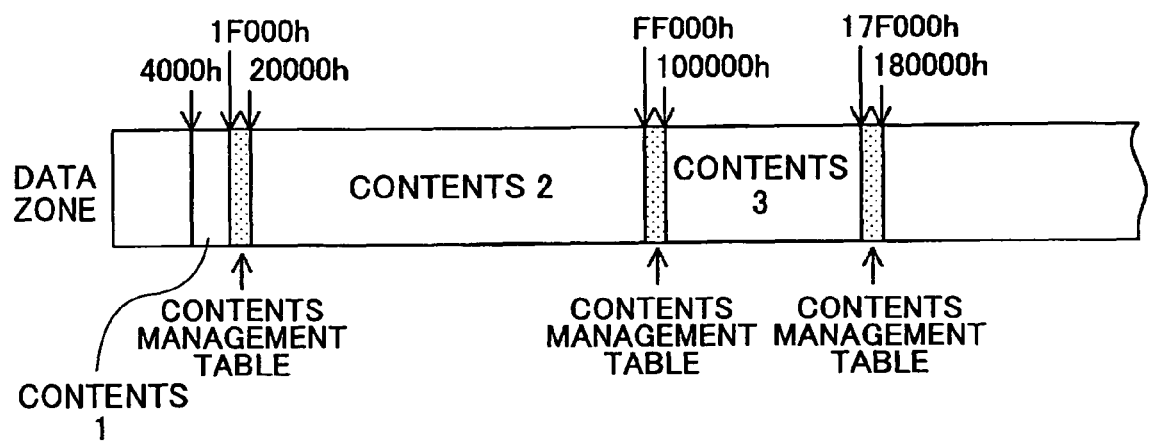
FIG. 15 is a zone map showing locations of contents, and a contents management table stored in the DVD disk.
Figure 17:
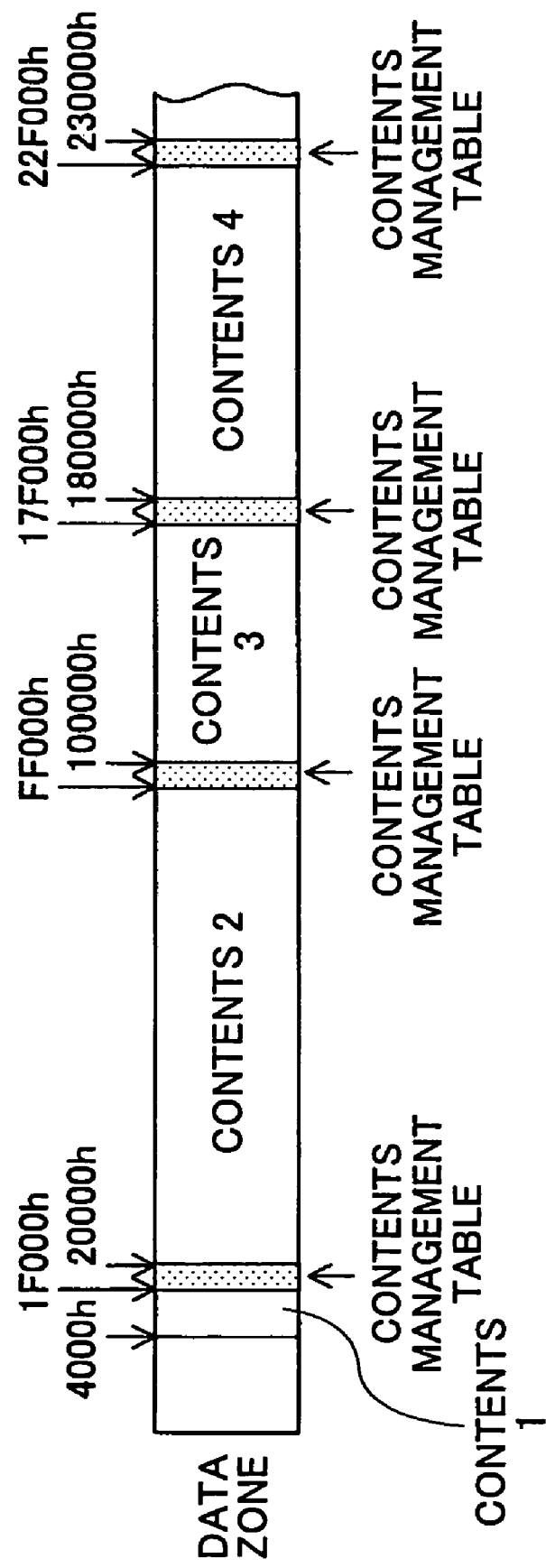
FIG. 17 is a zone map in the case where new contents are stored in the contents management table shown in FIG. 15.

Contents are stored in the data zone, and a contents management table is stored in the zone following the contents as shown in FIG. 15. The contents management table includes a management number, a title, a channel, starting date and time, ending date and time, recording quality, location information, a kind of the contents, and a state. Further, the contents management table is updated as contents are newly recorded and the state changes.

FIG. 15 shows an example wherein three sets of contents (contents 1 through contents 3) are stored in the DVD 15A and the corresponding latest contents management tables follows the sets of contents as shown in FIG. 16.

According to the example, as for the contents 1, the title is "News", the channel is "Terrestrial A 2ch", the starting date and time are "Jan. 24, 2003 10:00", the ending date and time are "Jan. 24, 2003 11:00", the recording quality is "LP", the location information is "004000h through 01F000h", the kind of the contents is "Copy Free", and the state is "Present". As for the contents 2, the title is "Prime Hours", the channel is "Terrestrial A 5ch", the starting date and time are "Jan. 25, 2003 19:00", the ending date and time are "Jan. 25, 2003 12:00", the recording quality is "SP", the location information is "020000h through 0FF000h", the kind of the contents is "Copy Once", and the state is "Present". As for the contents 3, the title is "Serial Drama", the channel is "Satellite B 13ch", the starting date and time are "Jan. 26, 2003 07:00", the ending date and time are "Jan. 26, 2003 07:40", the recording quality is "SP", the location information is "100000h through 17F000h", the kind of the contents is "Copy Once", and the state is "Present".

The title and the recording quality are set up by the user, wherein the quality "LP" represents Long Play, "SP" represents Standard Play, and "HQ" represents "High Quality". The kind of contents is determined based on information attached to the contents. "Copy Free" means that duplications are free. "Copy Once" means that only one copy of the contents is allowed to be present. "Copy Never" means that no copying allowed, that is, recording is forbidden.

A state "Present" means that the contents are stored in the DVD 15A and are reproducible. When the contents of the DVD 15A are displayed in a list form, only contents that are "Present" are displayed.

When new contents (contents 4) are stored in the DVD 15A, the contents management table for the contents 4 is added in the zone following the contents 4. Then, information about the contents 4 is added as shown in FIG. 18, where the title is "Midnight Movie", the channel is "Satellite B 11ch", the starting date and time are "Feb. 1, 2003 23:50", the ending date and time are "Feb. 2, 2003 01:30", the quality is "HQ", the location information is "180000h through 22F000h", the contents kind is "Copy Free", and the state is "Present".

Here, a process and operations of moving the contents currently stored in the DVD 15A using the DVD recorder 100 described above to the hard disk 110b as an information recording medium other than an optical disk are described. For example, the contents 3 are to be moved to the hard disk 110b from the DVD 15A.

Figure 19:
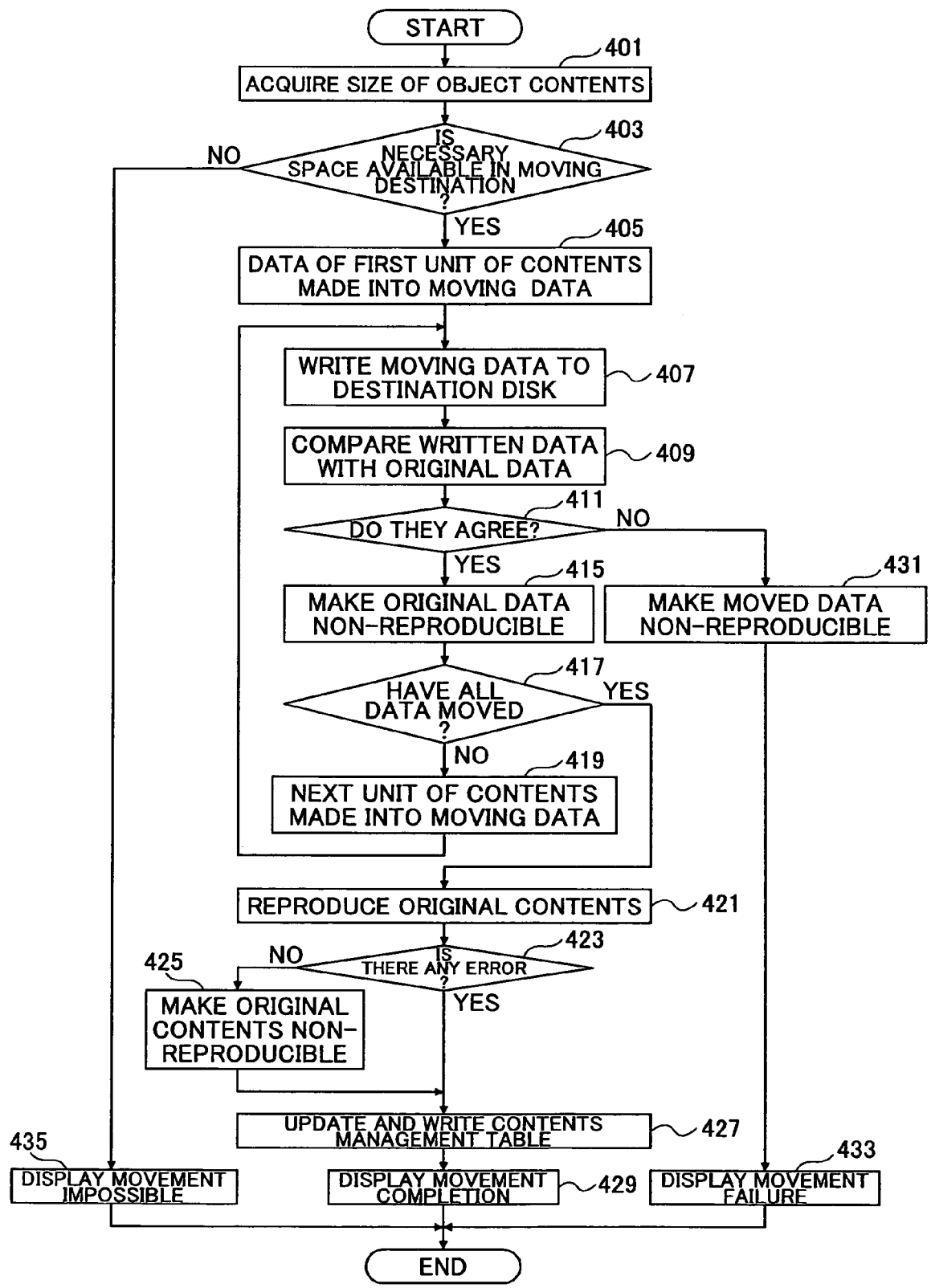
FIG. 19 is a flowchart of a moving process of moving the contents by the DVD recorder shown in FIG. 13.

From the contents shown by the display 200, the user selects the "Serial drama" and issues a moving command using the infrared remote control (not illustrated). Then, a starting address of a program for moving (moving program) stored in the flash ROM 104 is loaded in the program counter of the MPU 101, and the moving program is started. The moving program is for executing the steps shown in the flowchart of FIG. 19. The flowchart of FIG. 19 is equivalent to a series of steps in the processing algorithm performed by the MPU 101. Here, it is presupposed that the latest contents management table in the DVD 15A has already been read through the DVD drive apparatus 112, and is stored in the DRAM 103.

First, at step 401 the size (the amount) of the data is acquired with reference to the location information of the contents to be moved in the contents management table stored in the DRAM 103. The contents to be moved may be called "object contents". Here, the size of the contents associated to the management number 3 is acquired.

At step 403 the available capacity of the hard disk 110b, which is to provide a space for moving the selected contents, is determined and acquired through the hard disk drive 110a. If there is sufficient space for moving the object contents, the process proceeds to step 405.

At step 405 a unit of the data of the object contents is made into data for movement. Here, the unit is equivalent to one ECC block.

At step 407 the data for movement are read from the DVD 15A through the DVD drive apparatus 112. Here, the kind (attribute) of the object contents is "Copy Once"; accordingly, decoding is performed by a well-known approach, encoding according to the hard disk 110b is performed such that the data are written into a write-in zone of the hard disk 110b through the hard disk drive 110a.

At step 409 the write-in zone data of the hard disk 110b are reproduced through the hard disk drive 110a, and the reproduced data are compared with the data for movement.

At step 411, it is determined whether the reproduced data and the data for movement are in agreement. If affirmative, the process proceeds to step 415.

Figure 20:
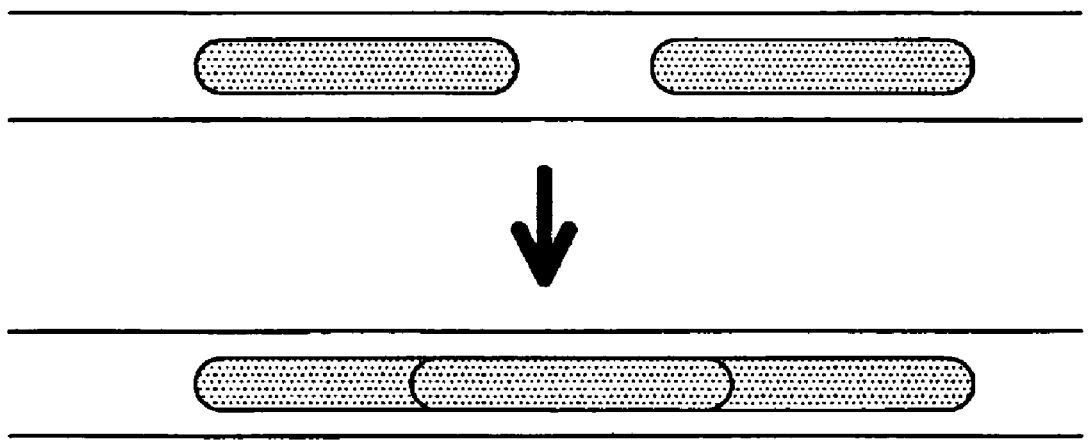
FIG. 20 is a zone map for explaining overwriting.

At step 415 the DVD drive apparatus 112 is directed to make the data for movement in the DVD 15A non-reproducible. Specifically, predetermined data are overwritten to the zone in which the data for movement in the DVD 15A are recorded (over-writing). In this way, the data of the zone are destroyed, for example, as shown in FIG. 20.

At step 417 it is determined whether all the data of the object contents are completely moved. The determination is easily carried out by comparing the number of ECC blocks of the object contents with the number of ECC blocks that have been moved. If not all the data have been moved, the process proceeds to step 419.

At step 419 the next unit of data of the object contents is made into the data for movement, and the process returns to step 407.

Steps 407 through 419 and determination are repeated until a determination at step 411 is denied or until a determination at step 417 is affirmed. That is, the data movement in ECC block units is continued.

If movement of all the data of the object contents is completed, that is, if the determination at step 417 is affirmative, the process proceeds to step 421.

At step 421 the object contents of the DVD 15A are reproduced through the DVD drive apparatus 112.

At step 423 it is determined whether there is a reproduction error. If affirmative, the process proceeds to step 427.

Figure 22:
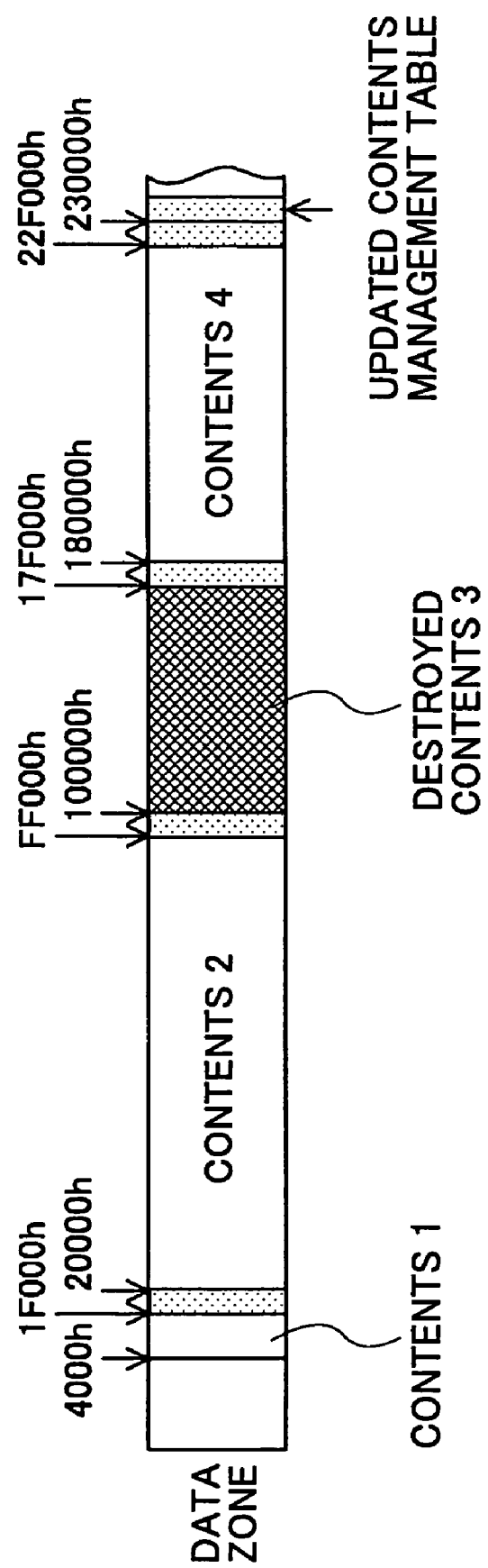
FIG. 22 is a zone map of a data zone of the DVD disk after the moving process shown by FIG. 19.

At step 427, the contents management table is updated and written into the DVD 15A through the DVD drive apparatus 112. Here, the state of the management number 3 associated with the contents 3 is updated to read, e.g., "Destroyed" as shown in FIG. 21. The updated contents management table is written, for example, in the zone following the contents management table currently stored in the zone following contents 4, as shown in FIG. 22. That is, the contents management table that is placed at the most outer side is the latest contents management table.

At step 429 a message indicating that the movement has been completed is displayed on the display 200, and the moving process is ended.

In addition, at step 423, if there is no reproduction error, the process proceeds to step 425. At step 425, the DVD drive apparatus 112 is directed so that the object contents in the DVD 15A become non-reproducible. Specifically, predetermined data are overwritten to the zone where the object contents in the DVD 15A are recorded (over-writing). Then, the process proceeds to step 427.

Further, at step 411, if the reproduced data and the data for movement are not in agreement, the process proceeds to step 431. At step 431 the hard disk drive 110a is controlled so that the data moved to the hard disk 110b become non-reproducible. Specifically, the data moved to the hard disk 110b are erased from the hard disk 110b. Further, at step 433 a message indicating that the movement has not been successful is displayed on the display 200. Then, the moving process is ended.

Furthermore, at step 403, if there is no space available for recording the object contents in the hard disk 110b, the process proceeds to step 435. At step 435 a message indicating that the data cannot be moved is displayed on the display 200. Then, the moving process is ended.

As described above, according to the DVD recorder 100 of the present embodiment, the process is carried out by the MPU 101 and the program is executed by the MPU 101.

Further, according to the embodiment, the program concerning the embodiment of the present invention is executed by the moving process program of the programs stored in the flash ROM 104.

As described above, according to the DVD recorder 100 of the present embodiment, the object contents currently stored in the DVD 15A (write-once optical disk) are divided into two or more blocks of one ECC block size, each block is written to the recording zone of the hard disk 110b (information recording media other than an optical disk) block by block, each block of the DVD 15A corresponding to the block written to the hard disk 110b is erased, i.e., overwritten block by block. In this way, the object contents stored in the DVD 15A are erased, and the object contents are moved to the hard disk 110b from the DVD 15A. That is, the object contents can be moved from the DVD 15A to the hard disk 110b without legal jeopardy, even if the object contents are copy-once contents. Therefore, the "copy-once" contents stored in the write-once optical disk can be legally moved to an information recording media other than an optical disk.

Further, according to the present embodiment, the zone of the DVD 15A where the object contents were once stored, moved, and overwritten is reproduced; when there is no reproduction error, the zone is overwritten again. In this way, erasure of the object contents from the DVD 15A is assured.

In addition, although the embodiment describes the case where the object contents are moved per ECC block in the moving process, it is not a limiting factor; two or more ECC blocks may constitute the unit for moving.

<<Modification of the Moving Process>>

Figure 23:
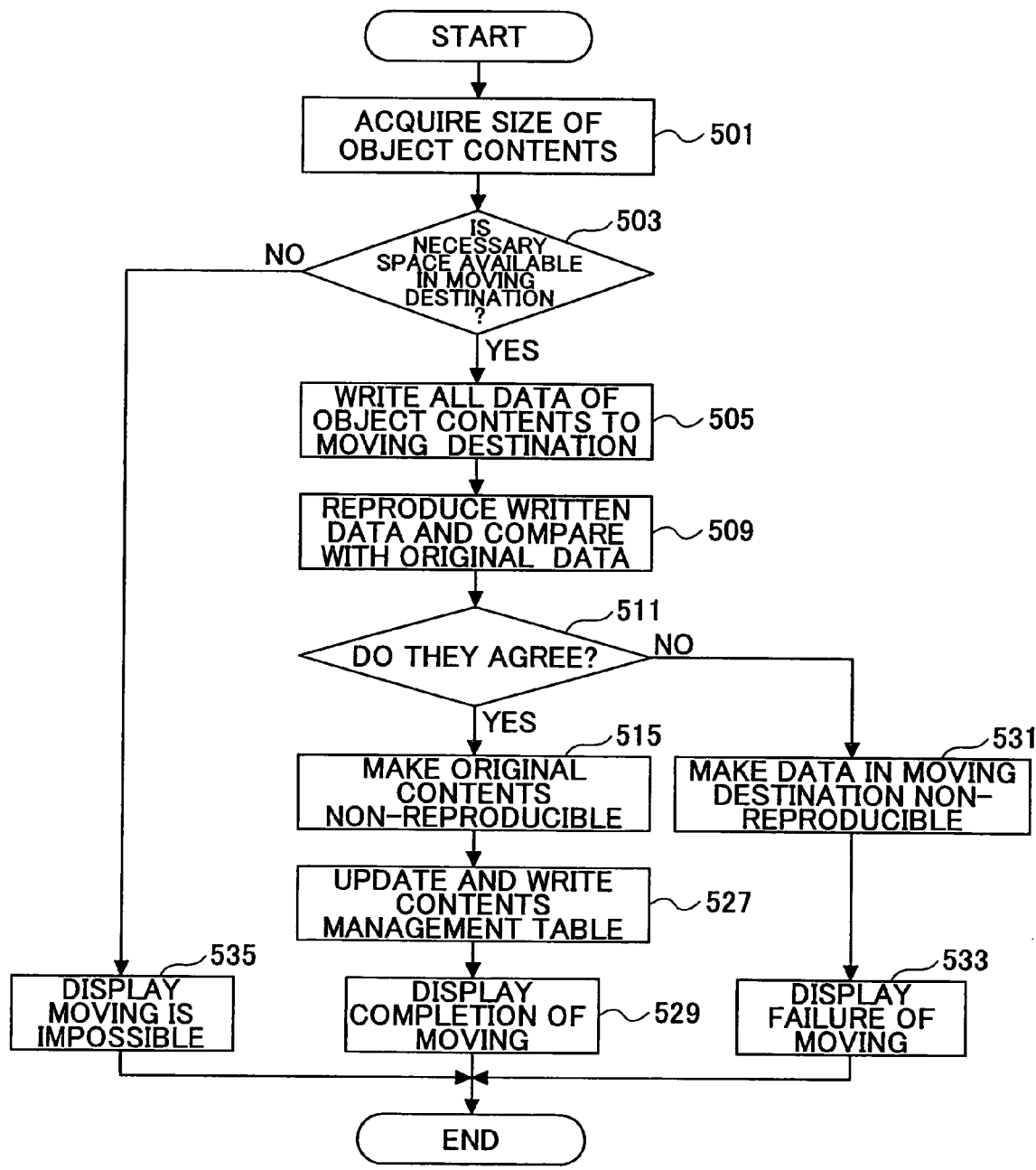
FIG. 23 is a flowchart of a variation of the moving process of the contents carried out by the DVD recorder shown in FIG. 13.

Further, in the moving process, all the object contents may be moved in one action. A process and operations of the MPU 101 at this time are described using the flowchart of FIG. 23.

First, at step 501 the size of the object contents is acquired the same way as at step 401.

At step 503 an available capacity of the hard disk 110b with reference to the size of object contents to be moved is determined the same way as step 403. If there is sufficient space available, the process proceeds to step 505.

At step 505 all the data of the object contents are read from the DVD 15A through the DVD drive apparatus 112, and are written to the write-in zone of the hard disk 110b through the hard disk drive 110a.

At step 509 the write-in zone of the hard disk 110b is reproduced through the hard disk drive 110a, and the reproduced data and the data of the object contents are compared.

At step 511 it is determined whether the reproduced data and the data of object contents are in agreement. If affirmative, the process proceeds to step 515.

At step 515 the DVD drive apparatus 112 is directed to make the object contents in the DVD 15A non-reproducible. Specifically, predetermined data are overwritten to the zone in which the object contents are stored in the DVD 15A (over-writing). In this case, although all of the zones where the object contents are recorded may be overwritten, only a part of the zone may be overwritten so long as the object contents are made non-reproducible.

At step 527, as at step 427, the contents management table is updated and written into the DVD 15A through the DVD drive apparatus 112.

At step 529 a message indicating that the movement is successfully completed is displayed on the display 200, and the moving process is ended.

In addition, at step 511, if the reproduced data and the data of object contents are not in agreement, the process proceeds to step 531. At step 531 the hard disk drive 110a is directed to make the data moved to the hard disk 110b non-reproducible as at step 431. Then, at step 533 the message indicating that the movement is not successful is displayed on the display 200. Then, the moving process is ended.

Furthermore, at step 503, if there is no space available for recording the size of object contents in the hard disk 110b, the process proceeds to step 535. At step 535, a message indicating that the movement cannot be performed is displayed on the display 200. Then, the moving process is ended.

In this way, the time required of the moving process can be shortened. Here, although two copies of the object contents temporarily exist in this case, a copy of the two copies is immediately made non-reproducible. Accordingly, the user is not provided with two copies of the object contents.

Further, although predetermined data are overwritten into the zone in which the object contents were recorded such that the object contents in the DVD 15A are made non-reproducible in this case, it is also possible to arrange such that contents information indicating that the object contents have been erased be recorded to the DVD 15A without erasing the object contents. That is, only the state of the contents management table is updated to read "Destroyed" such that reproduction is made impossible. In this way, the time required of the moving process can be shortened.

Here, if it is desired to differentiate the case where the data are really destroyed (overwritten) from the case where the state of the contents management table is changed to non-reproducible, the former may be shown by "Destroyed", and the latter may be shown by "Deleted", for example, as shown in FIG. 24. In this way, if, afterward, a recording request (revival request) of recording the object contents to the DVD 15A is made, only the state in the contents management table need be changed as shown in FIG. 25. Such a request can be met in a short time. Here, in the case of "Deletion", the object contents remain in the DVD 15A, unreadable as they are. A content provider may contain information as to whether "Deletion" is allowed.

Figure 26:
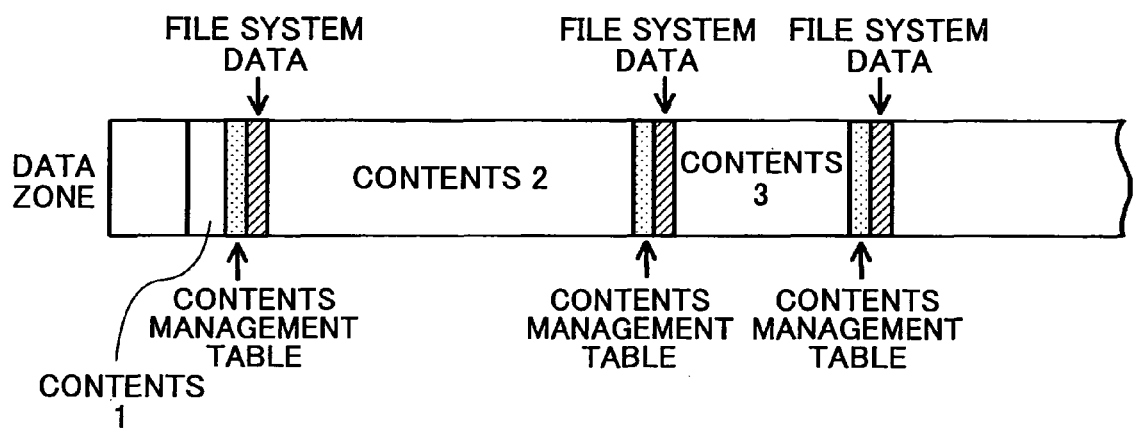
FIG. 26 is a zone map showing the data zone when using a file system.

Further, in the embodiment, a file system may be employed. In this case, for example, file system data are to be updated with the contents management table as shown in FIG. 26. That is, when the contents are moved, the associated file information about the contents is erased from the file system data. In this way, a DVD drive apparatus that does not work with the contents management table can properly perform access to the DVD 15A.

Further, although the embodiment has been described about the case where the information recording apparatus is a DVD recorder, the information recording apparatus may be a personal computer that includes a DVD drive apparatus and a hard disk drive. Further, the DVD drive apparatus and the hard disk drive of the personal computer may be either built into the personal computer or connected externally.

Further, although the embodiment has been described about the case where the optical disk is a DVD+R disk, the present invention is not limited to this, but rather optical disks such as DVD–R, a CD–R, and a next generation disk using a wavelength of about 405 nm may be used.

Further, although the embodiment has been described about the case where the recording medium used as the movement place of the contents is a hard disk, it is not limited to this, but rather other devices such as a memory card and a USB memory may serve the purpose. In short, what is necessary is a storage device other than an optical disk.

Further, according to the embodiment, although the program concerning the present invention is stored in the flash ROM 104, it may be stored in other recording media such as a CD, a magneto-optical disk, a DVD disk, a memory card, a USB memory, and a flexible disk. In this case, the program concerning the present invention is loaded into the flash ROM 104 through a reproducing apparatus (or an appropriate interface, as applicable) corresponding to the recording medium. Further, the program may be provided through networks such as LAN, Intranet, and Internet to the flash ROM 104. In short, the program concerning the present invention should just be stored in the flash ROM 104.

The present application is based on Japanese Priority Application No. 2004-130285 filed on Apr. 26, 2004, and Japanese Priority Application No. 2004-153263 filed on May 24, 2004 with the Japanese Patent Office, the entire contents of which are hereby incorporated by reference.

The invention claimed is:

1. An information recording system using an optical disk as an object medium of information recording, comprising:
a first optical disk apparatus and a second optical disk apparatus for reproducing from and recording to an optical disk;
a control unit for irradiating a laser light to a first optical disk loaded in the first optical disk apparatus so that contents stored in the first optical disk are made non-reproducible when the contents have been written into a second optical disk loaded in the second optical disk apparatus;
wherein power of the laser light is equal to recording power; and
wherein the control unit irradiates the laser light only to a zone that stores management information which zone is in a recording zone of the first optical disk.

2. The information recording system as claimed in claim 1, wherein the control unit intermittently irradiates the laser light.

3. The information recording system as claimed in claim 1 wherein the first optical disk contains two or more sets of contents; and the control unit irradiates the laser light only to a zone of the first optical disk, in which zone the contents that have been written into the second optical disk are stored.

4. The information recording system as claimed in claim 1 wherein the first optical disk stores two or more sets of contents; and the control unit irradiates the laser light only to the zone of the first optical disk, in which zone management information on the contents that have been written into the second optical disk is stored.

5. The information recording system as claimed in claim 1, wherein the control unit irradiates the laser light of power equal to the recording power to the first optical disk when writing the contents into the second optical disk is successfully performed.

6. The information recording system as claimed in claim 1 comprising: a determining unit for determining whether a frequency of errors when reproducing the contents stored in the first optical disk is equal to or greater than a predetermined threshold value; wherein the control unit writes the contents into the second optical disk if the determining unit determines that the frequency is equal to or greater than the predetermined threshold value.

7. A non-transitory computer-readable storage medium that stores a computer-executable program used by control units of an information recording system which system has a first optical disk apparatus and a second optical disk apparatus, said computer-executable program comprising:
a first step of writing contents stored in a first optical disk loaded in the first optical disk apparatus into a second optical disk loaded in the second optical disk apparatus; and
a second step of irradiating a laser light of power equal to recording power to the first optical disk loaded in the first optical disk apparatus after the first step of writing is completed so that the contents in the first optical disk are made non-reproducible; and
wherein the second step of irradiating the laser light irradiates the laser light only to a zone of the first optical disk, in which zone management information is stored.

8. The medium as claimed in claim 7, wherein the second step of irradiating the laser light intermittently irradiates the laser light.

9. The medium as claimed in claim 7, wherein where two or more sets of contents are stored in the first optical disk, the second step of irradiating the laser light irradiates the laser light only to a zone of the first optical disk, in which zone the contents written into the second optical disk are present.

10. The medium as claimed in claim 7, wherein where two or more contents are stored in the first optical disk, the second step of irradiating the laser light irradiates the laser light only to the zone of the first optical disk, in which zone the management information on the contents that are written into the second optical disk is stored.

11. A medium as claimed in claim 7, comprising: a third step of determining whether the first step of writing has been successfully performed; wherein the second step is carried out if the third step provides an affirmative result.

12. The medium as claimed in claim 7, comprising: a fourth step of determining whether a frequency of errors generated when reproducing the contents stored in the first optical disk is equal to or greater than a predetermined threshold value; wherein the fourth step is carried out in advance of the first step.

13. An information recording apparatus, comprising:
an optical disk apparatus for recording and reproducing to and from a write-once optical disk; and
a processing unit for writing predetermined data to the write-once optical disk through the optical disk apparatus when contents stored in the write-once optical disk have been written to an information recording medium other than an optical disk so that the contents in the write-once optical disk are made non-reproducible; and
wherein the processing unit determines that there is no reproduction error of the contents prior to writing predetermined data to the write-once optical disk.

14. The information recording apparatus as claimed in claim 13, wherein the processing unit writes information that indicates that the contents have been erased into the optical disk through the optical disk apparatus, without erasing the contents so that the contents in the write-once optical disk are made non-reproducible.

15. The information recording apparatus as claimed in claim 14, wherein the processing unit writes information that indicates that the contents are revived into the optical disk through the optical disk apparatus when recording the contents to the write-once optical disk is required after making reproduction of the contents impossible.

16. The information recording apparatus as claimed in claim 13, wherein the processing unit overwrites predetermined data into at least a part of a zone wherein the contents are stored in the write-once optical disk through the optical disk apparatus so that the contents are made non-reproducible.

17. The apparatus as claimed in claim 16, wherein the information recording apparatus writes information that indicates that the zone where the contents are recorded has been overwritten into the write-once optical disk through the optical disk apparatus.

18. The information recording apparatus as claimed in claim 16, wherein the processing unit overwrites predetermined data through the optical disk apparatus after all the contents are normally written into the information recording medium other than an optical disk.

19. The information recording apparatus as claimed in claim 16, wherein the processing unit divides the contents into two or more blocks of a predetermined size, writes each of the blocks into an information recording medium other than an optical disk, and overwrites the predetermined data through the optical disk apparatus into a zone of the write-once optical disk, in which zone the block written into the information recording medium other than the optical disk is present when writing is successfully completed.

20. The information recording apparatus as claimed in claim 16, wherein the zone of the write-once optical disk wherein the contents are recorded is reproduced through the optical disk apparatus, and the predetermined data are overwritten again through the optical disk apparatus into the zone when there is no reproduction error after the contents have been successfully moved.

* * * * *